(12) United States Patent
Sugasawa et al.

(10) Patent No.: US 6,345,024 B2
(45) Date of Patent: Feb. 5, 2002

(54) REPRODUCTION APPARATUS AND REPRODUCTION METHOD

(75) Inventors: Masashi Sugasawa, Chiba; Shiro Morotomi, Kanagawa, both of (JP)

(73) Assignee: Sony Corporation, Tokyo (JP)

(\*) Notice: Subject to any disclaimer, the term of this patent is extended or adjusted under 35 U.S.C. 154(b) by 0 days.

(21) Appl. No.: 09/742,483

(22) Filed: Dec. 20, 2000

Related U.S. Application Data

(62) Division of application No. 09/249,239, filed on Feb. 11, 1999.

(30) Foreign Application Priority Data

Feb. 24, 1998 (JP) .......................................... 10-041899

(51) Int. Cl.[7] .............................................. G11B 7/00
(52) U.S. Cl. ..................................... 369/53.2; 386/126
(58) Field of Search ............................... 369/53.2, 53.3, 369/53.37, 47.39, 291; 386/126

(56) References Cited

U.S. PATENT DOCUMENTS

| | | | | |
|---|---|---|---|---|
| 5,235,581 A | * | 8/1993 | Miyagawa et al. | 369/53.2 X |
| 5,764,610 A | * | 6/1998 | Yoshida et al. | 369/53.22 |
| 5,835,461 A | * | 11/1998 | Kobayashi et al. | 369/44.13 X |
| 5,870,375 A | * | 2/1999 | Maeda et al. | 369/59.25 X |
| 5,978,333 A | * | 11/1999 | Kobayashi et al. | 369/44.41 |
| 6,201,778 B1 | * | 3/2000 | Sensyu | 369/275.3 X |
| 6,125,087 A | * | 9/2000 | Ohnishi et al. | 369/44.41 |
| 6,147,941 A | * | 11/2000 | Kumagai | 369/53.2 X |

FOREIGN PATENT DOCUMENTS

| | | | |
|---|---|---|---|
| EP | 0525896 A2 | 2/1993 | G11B/7/09 |
| EP | 0745978 A1 | 12/1996 | G11B/7/09 |
| EP | 0798702 A2 | 10/1997 | G11B/7/007 |

OTHER PUBLICATIONS

Patent Abstracts of Japan, JP 10–40549, Published Feb. 13, 1998, Sony Corp.

\* cited by examiner

Primary Examiner—Aristotelis M. Psitos
(74) Attorney, Agent, or Firm—Oblon, Spivak, McClelland, Maier & Neustadt, P.C.

(57) ABSTRACT

The invention provides an apparatus and method which allows playback of both of a first optical disc wherein the opposite side faces of a groove formed thereon are wobbled at a first predetermined frequency and a second optical disc wherein one of the opposite side faces of a groove formed thereon is wobbled at a second frequency shorter than the first predetermined frequency while the other face of the groove is formed as a flat face. In the apparatus and method, it is discriminated whether an object optical disc of playback is the first optical disc or the second optical disc, and various servo systems are switched based on a result of the discrimination.

5 Claims, 16 Drawing Sheets

| | MD-DATA2 | MD-DATA1 |
|---|---|---|
| TRACK PITCH | 0.95μm | 1.6μm |
| BIT LENGTH | 0.39μm/bit | 0.59μm/bit |
| λ · NA | 650nm · 0.52 | 780nm · 0.45 |
| RECORDING METHOD | LAND RECORDING | GROOVE RECORDING |
| ADDRESSING METHOD | INTERLACE ADDRESSING (DOUBLE SPIRAL, ONE-SIDED WOBBLE) | SINGLE SPIRAL, DOUBLE-SIDED WOBBLE |
| MODULATION METHOD | RLL (1, 7) | EFM |
| ERROR CORRECTION METHOD | RS-PC | ACIRC |
| INTERLEAVE | BLOCK CLOSING | CONVOLUTION |
| REDUNDANCY | 19.7% | 46.3% |
| LINEAR VELOCITY | 2.0m/s | 1.2m/s |
| DATA RATE | 589kB/s | 133kB/s |
| RECORDING CAPACITY | 650MB | 140MB |

FIG. 3

| | MD-DATA2 | MD-DATA1 |
|---|---|---|
| TRACK PITCH | 0.95μm | 1.6μm |
| BIT LENGTH | 0.39μm/bit | 0.59μm/bit |
| λ·NA | 650nm·0.52 | 780nm·0.45 |
| RECORDING METHOD | LAND RECORDING | GROOVE RECORDING |
| ADDRESSING METHOD | INTERLACE ADDRESSING (DOUBLE SPIRAL, ONE-SIDED WOBBLE) | SINGLE SPIRAL, DOUBLE-SIDED WOBBLE |
| MODULATION METHOD | RLL (1,7) | EFM |
| ERROR CORRECTION METHOD | RS-PC | ACIRC |
| INTERLEAVE | BLOCK CLOSING | CONVOLUTION |
| REDUNDANCY | 19.7% | 46.3% |
| LINEAR VELOCITY | 2.0m/s | 1.2m/s |
| DATA RATE | 589kB/s | 133kB/s |
| RECORDING CAPACITY | 650MB | 140MB |

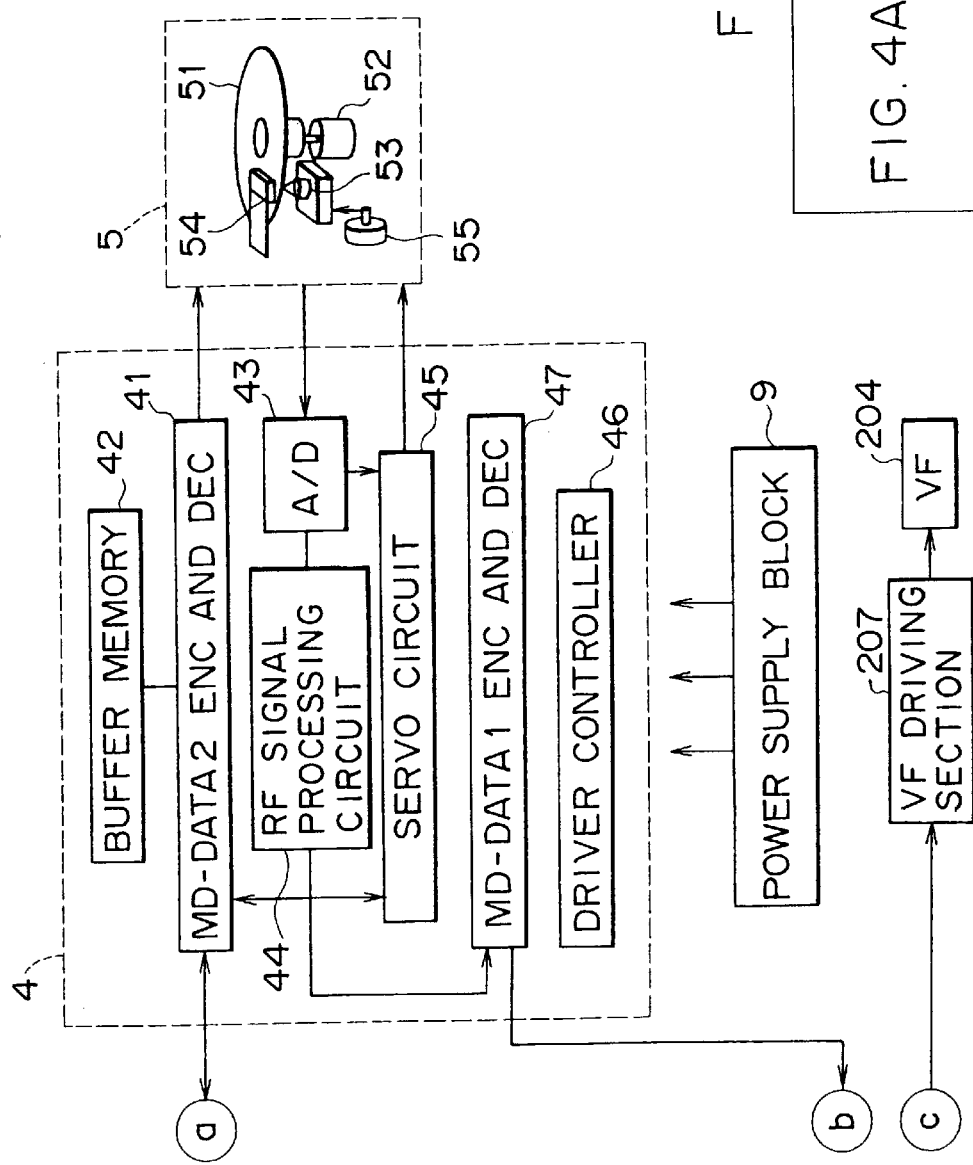

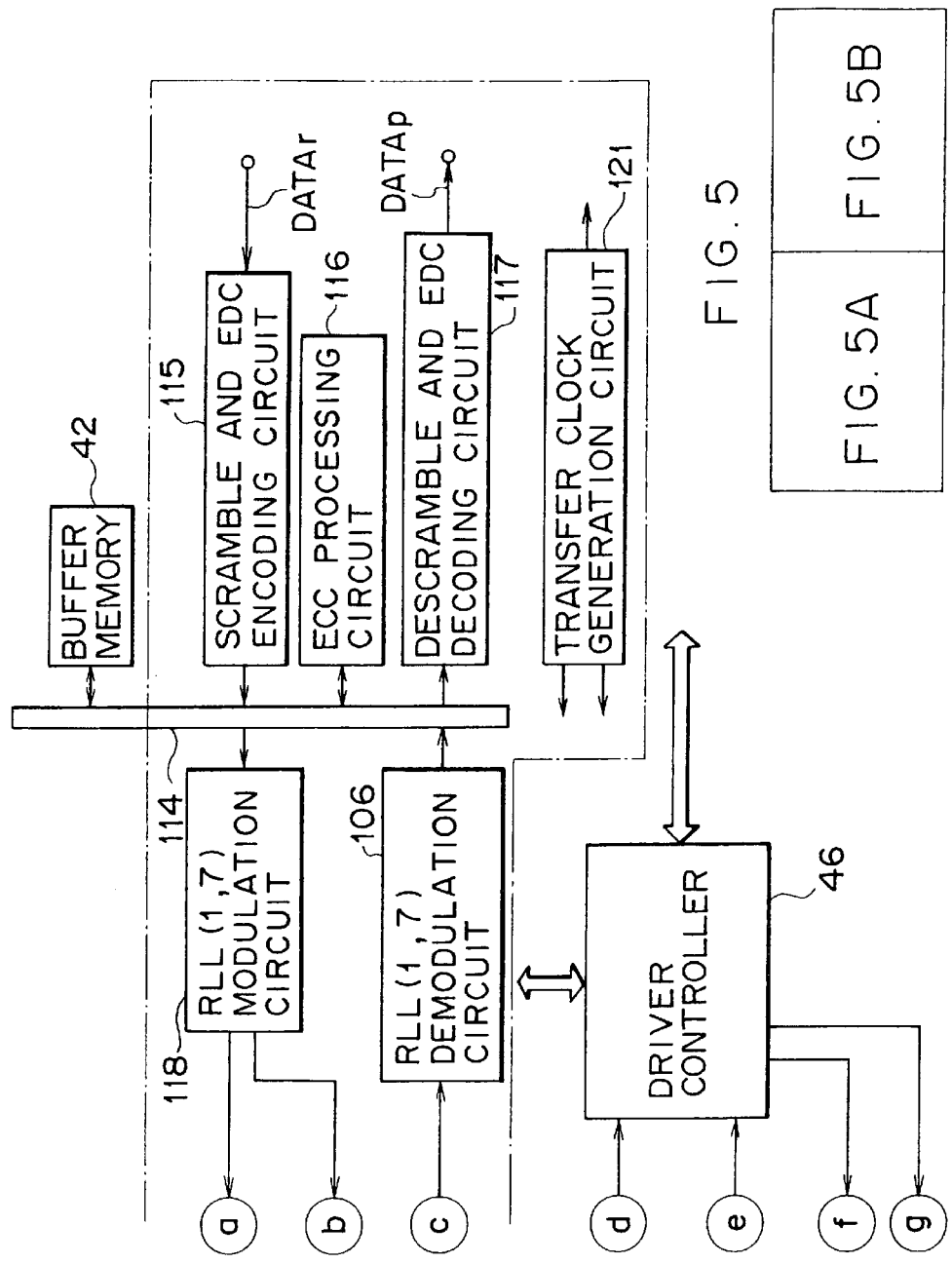

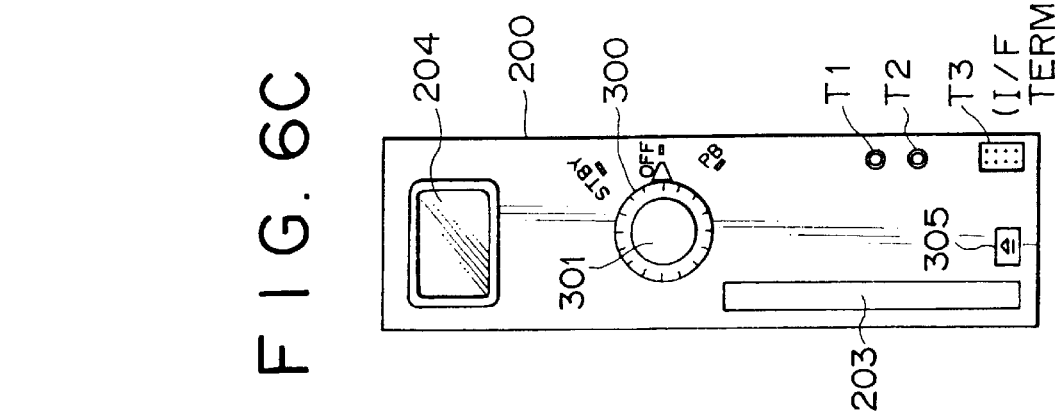
FIG. 6C
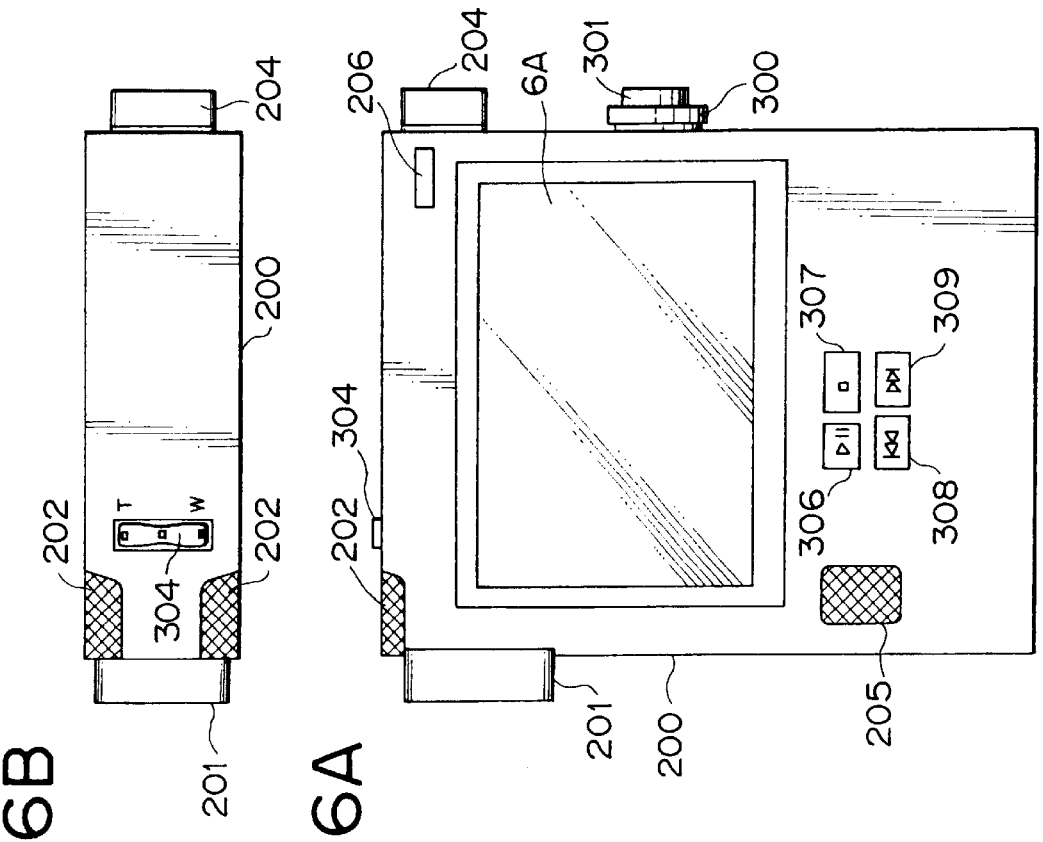
FIG. 6B
FIG. 6A

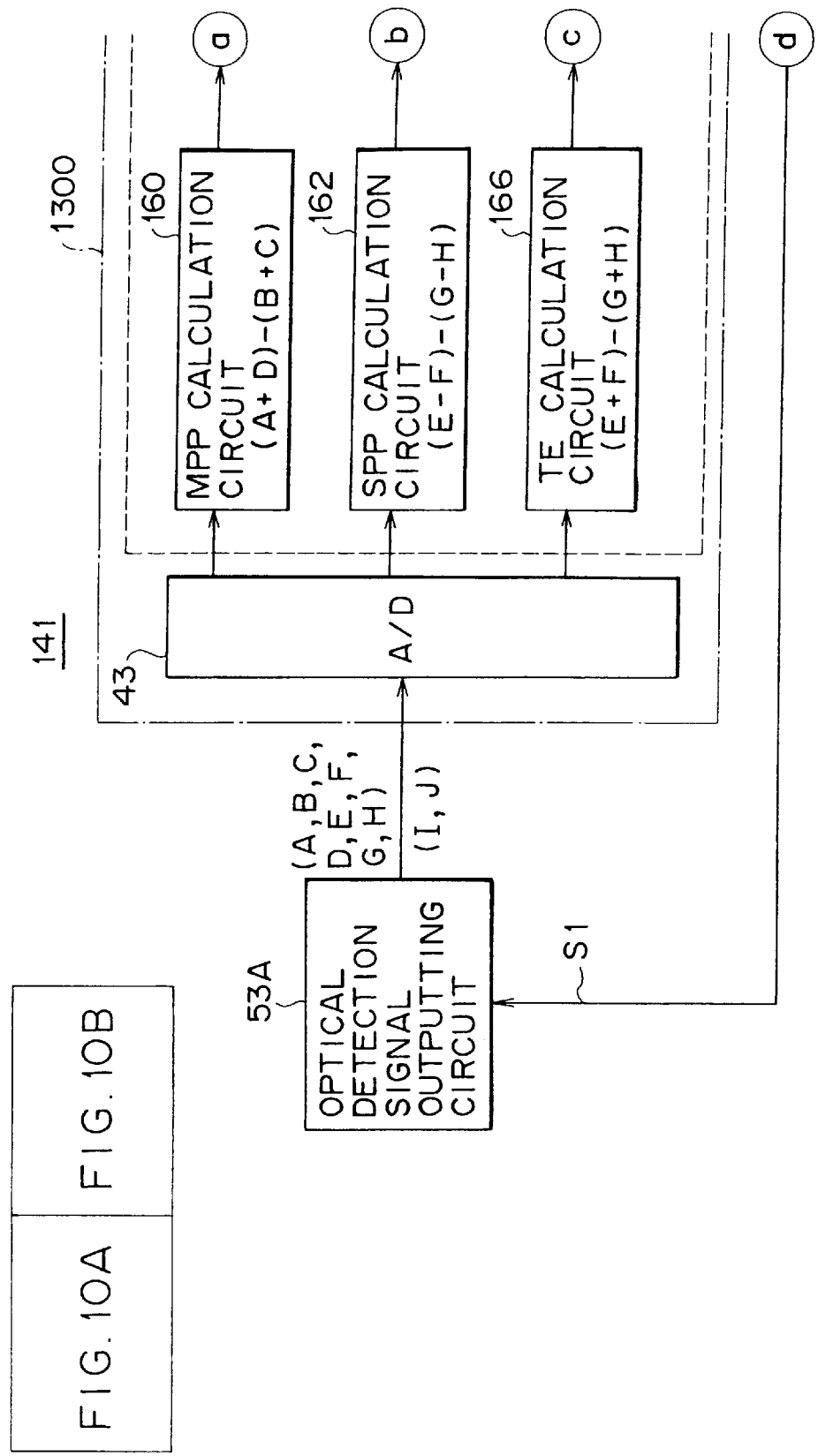

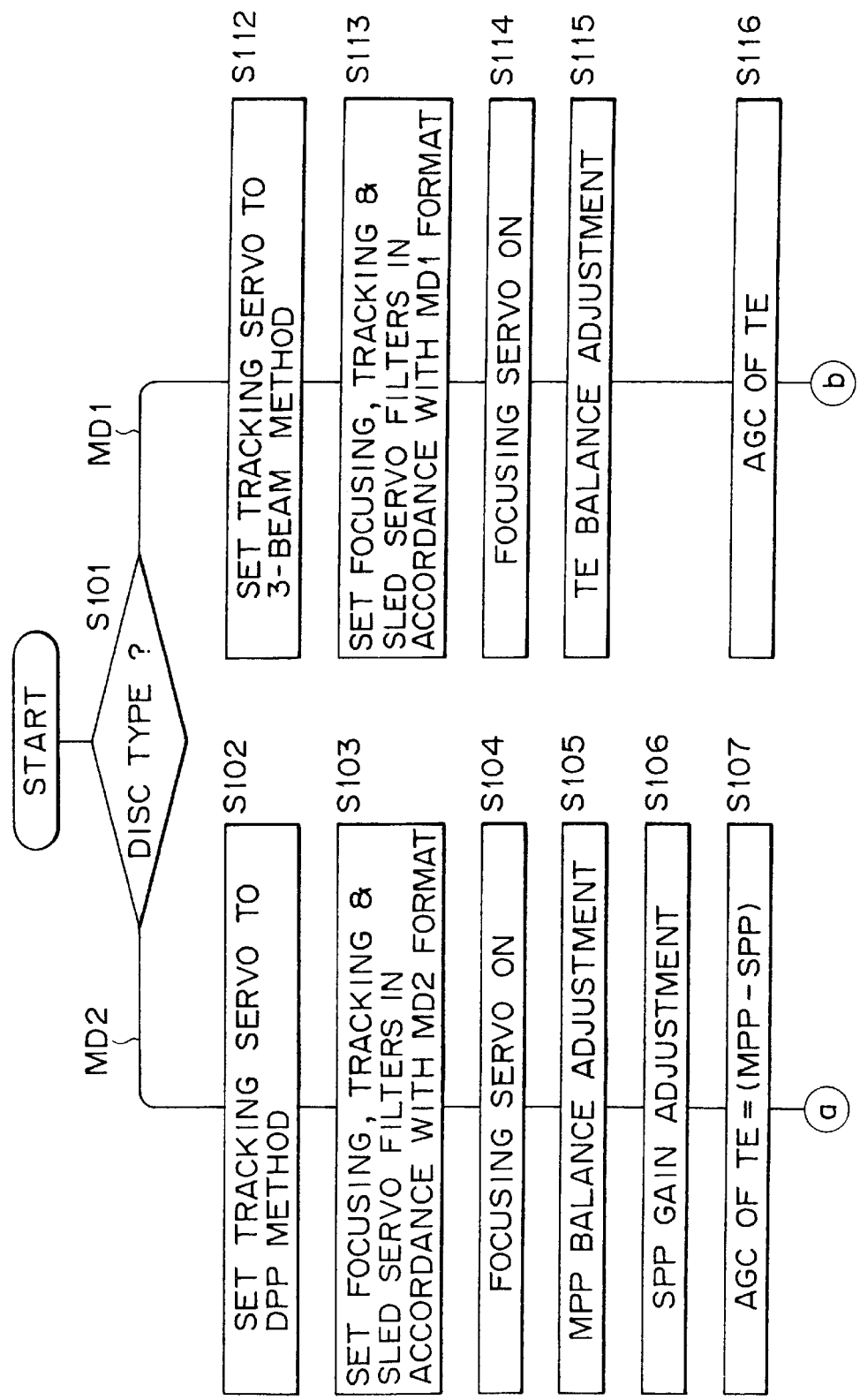

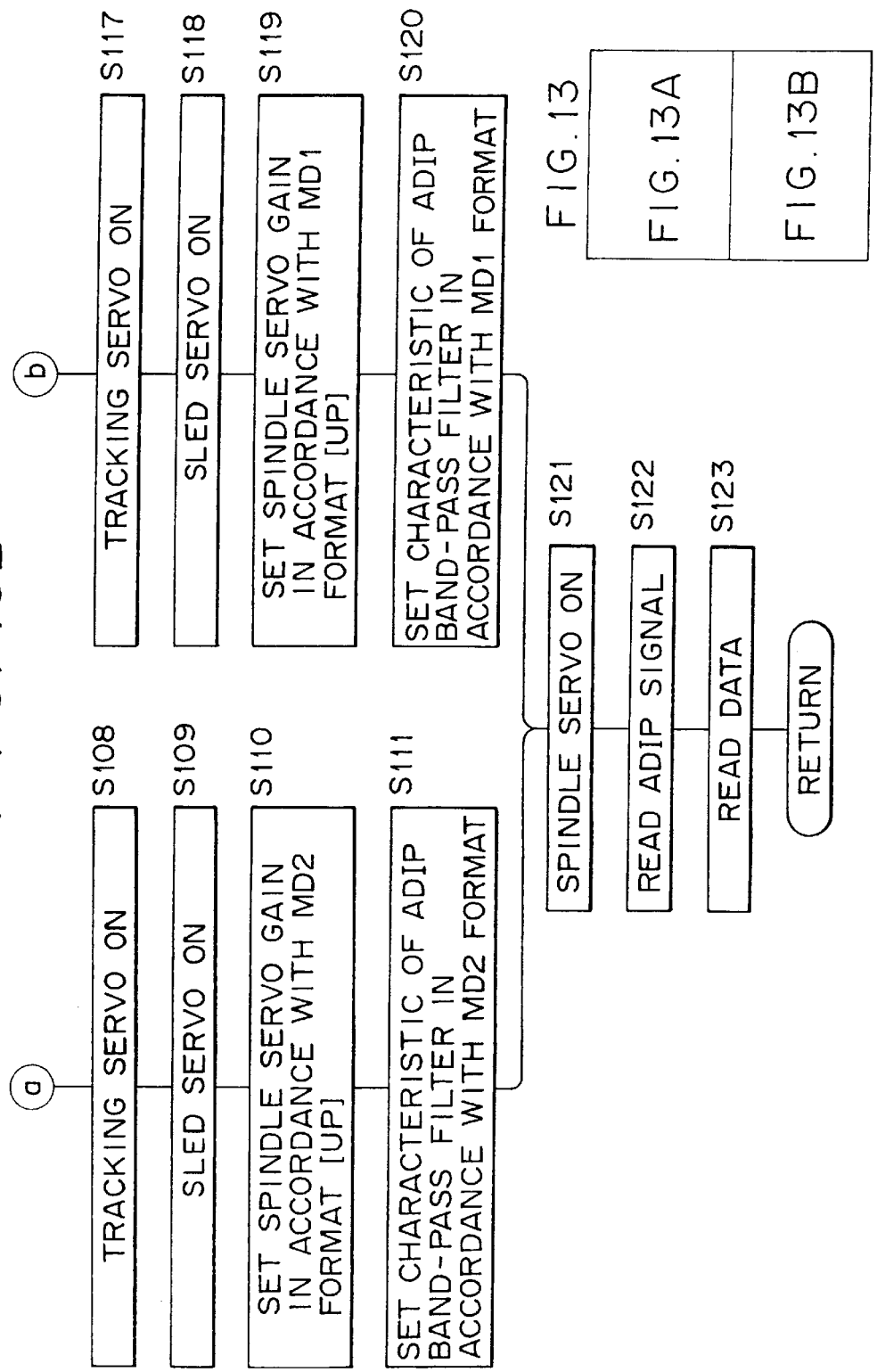

REPRODUCTION APPARATUS AND REPRODUCTION METHOD

This is a divisional of application Ser. No. 09/249,239, filed Feb. 11, 1999.

BACKGROUND OF THE INVENTION

1. Field of the Invention

This invention relates to a reproduction apparatus and a reproduction method which can play back both of a first optical disc wherein wobbles of a first predetermined frequency are formed on the opposite side faces of a groove or a land and a second optical disc wherein wobbles of a second predetermined frequency are formed on one side face of a groove or a land.

2. Description of the Related Art

Conventionally, a disc called mini disc (Mini Disc: trademark) is known wherein grooves wobbled at a predetermined frequency are provided in advance on a magneto-optical disc of a diameter of 64 mm and data are recorded on the wobbled grooves.

The mini disc mentioned above has address information recorded in a predetermined modulated condition on the grooves. Access control for the mini disc or retrieval of a recordable area of the mini disc is performed based on the address information.

The mini disc described above allows recording of a compressed audio signal for 74 minutes in the maximum and is considerably superior in convenience because it is superior in portability and exhibits a high access rate. A mini disc for an audio use may be hereinafter referred to simply as MD-DA (Mini Disc Digital Audio).

However, since the mini disc described above only has a limited recording capacity of FE production circuit 140 Megabytes, it is not sufficient to record a video signal thereon.

Further, while a format called MD-DATA1 is known as a format to be used to record computer data onto the mini disc, it is disadvantageous in that the rate in rewriting and reproduction operations is low because the recording density of it is as low as FE production circuit 140 Megabytes and the minimum recording data length is comparatively large.

SUMMARY OF THE INVENTION

It is an object of the present invention to provide a reproduction apparatus and a reproduction method by which servo controls suitable for different magneto-optical discs can be performed to allow reproduction of both of a magneto-optical disc having the conventional data format MD-DA and MD-DATA1 and another magneto-optical disc having the new data format MD-DATA2 for higher density recording.

In order to attain the object described above, according to an aspect of the present invention, there is provided a reproduction apparatus for selectively playing back a first optical disc wherein two side faces of each of grooves or lands formed thereon are wobbled at a first frequency and information is recorded on the wobbled grooves or lands and a second optical disc wherein one of two side faces of each of grooves or lands formed thereon is wobbled at a second frequency while the other side face of each of the grooves or lands is formed as a flat face and information is recorded on the grooves or lands, comprising an optical head for irradiating light upon a predetermined one of the grooves or lands and those of the lands or grooves adjacent the predetermined groove or land, first detection means for detecting reflected light from the predetermined groove or land, second detection means for detecting reflected light from the lands or grooves adjacent the predetermined groove or land, first calculation means for calculating a difference between the reflected light of the first detection means and the reflected light of the second detection means to produce a first tracking error signal, second calculation means for calculating a difference between the reflected light from one and the reflected light from the other of the lands or grooves adjacent the predetermined groove or land detected by the second detection means, discrimination means for discriminating whether an optical disc loaded on the reproduction apparatus is the first optical disc or the second optical disc, and tracking controlling means for performing, when the discrimination means discriminates that the loaded optical disc is the first optical disc, tracking control based on the first tracking error signal produced by the first calculation means, but performing, when the discrimination means discriminates that the loaded optical disc is the second optical disc, tracking control based on the second tracking error signal produced by the second calculation means.

According to another aspect of the present invention, there is provided a reproduction apparatus for selectively playing back a first optical disc wherein two side faces of each of grooves or lands formed thereon are wobbled at a first frequency and address information is recorded on the wobbled grooves or lands in advance and a second optical disc wherein one of two side faces of each of grooves or lands formed thereon is wobbled at a second frequency while the other side face of each of the grooves or lands is formed as a flat face and address information is recorded on the grooves or lands in advance, comprising an optical head for irradiating light upon a predetermined one of the grooves or lands and those of the lands or grooves adjacent the predetermined groove or land, detection means divided into at least two regions in a tracing direction of the optical head for detecting reflected light from the predetermined groove or land and the adjacent lands or grooves, first calculation means for adding detection outputs of the at least two regions of the detection means, second calculation means for subtracting a first one from a second one of the detection outputs of the at least two regions of the detection means, discrimination means for discriminating whether an optical disc loaded on the reproduction apparatus is the first optical disc or the second optical disc, selection means for switchably selecting one of the first calculation means and the second calculation means, controlling means for controlling the selection means so that, when the discrimination means discriminates that the loaded optical disc is the first optical disc, the first calculation means is selected, but when the discrimination means discriminates that the loaded optical disc is the second optical disc, the second calculation means is selected, address extraction means for extracting address information based on an output of the first or second calculation means selected by the selection means.

According to a further aspect of the present invention, there is provided a reproduction method for selectively playing back a first optical disc wherein two side faces of each of grooves or lands formed thereon are wobbled at a first frequency and information is recorded on the wobbled grooves or lands and a second optical disc wherein one of two side faces of each of grooves or lands formed thereon is wobbled at a second frequency while the other side face of each of the grooves or lands is formed as a flat face and information is recorded on the grooves or lands, comprising the steps of discriminating whether an object optical disc of playback is the first optical disc or the second optical disc, and producing, when it is discriminated by the discrimination step that the object optical disc is the first optical disc, a tracking error signal based on a side beam and performing tracking control based on the produced tracking error signal, but producing, when it is discriminated by the discrimination step that the object optical disc is the second optical disc, a tracking error signal based on a main beam and a side beam and performing tracking error control based on the produced tracking error signal.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a table illustrating a plurality of medium formats which are used in the reproduction apparatus according to the present invention;

FIGS. 6A, 6B and 6C are a side elevational view, a plan view and a rear elevational view, respectively, showing an appearance of the video camera shown in FIG. 4;

FIG. 13 is a flow chart illustrating a procedure of processing of the optical detection signal processing system shown in FIG. 9.

DESCRIPTION OF THE PREFERRED EMBODIMENT

Figure 1:
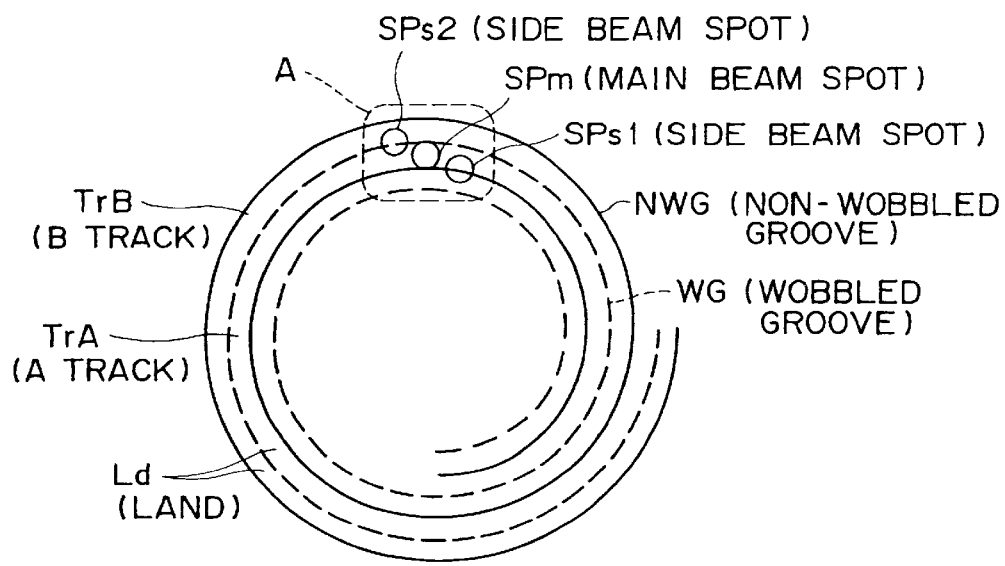
FIG. 1 is a diagrammatic view showing a track structure of a disc which can be used in a reproduction apparatus according to the present invention.

In the following, a preferred embodiment of the present invention is described with reference to the drawings. In the present embodiment, a reproduction apparatus according to the present invention is applied as a recording and reproduction apparatus section of a portable video camera wherein a camera apparatus section and a recording and reproduction apparatus section which can record and reproduce still pictures or moving pictures and an audio signal are integrated with each other. Further, the recording and reproduction apparatus section incorporated in the video camera has a construction which can record and reproduce data onto and from a mini disc (MINI DISC: trade mark) which is known as a kind of magneto-optical disc.

The description proceeds in the following order:
1. Disc format
2. Appearance construction of video camera
3. Internal construction of video camera
4. Construction of medium driving section
5. Example of disc structure for use with video camera
6. Construction of optical detection signal processing circuit system
   6-1. Construction of photodetector
   6-2. General construction of optical detection signal processing circuit system
   6-3. Construction of tracking servo circuit system
   6-4. ADIP processing circuit system
   6-5. Spindle servo circuit system
   6-6. Processing operation
7. Modifications
1. Disc format The recording and reproduction apparatus section incorporated in the video camera in the present embodiment performs recording and reproduction of data, for example, in accordance with a format for data called MD-DATA which is used to record and reproduce data onto and from a mini disc which is one of magneto-optical discs. As a format for recording and reproduction onto and from a mini disc, a format called MD-DATA1 has been developed for a recording medium for computed data and another format called MD-AUDIO has been developed for a recording medium for MD audio data for an audio signal. The MD-DATA1 format is common with a disc format on or an addressing method to a magneto-optical disc which will be hereinafter described in detail. Further, also another format called MD-DATA2 which allows recording of a higher density than that by the format MD-DATA1 has been developed. The video camera in the present embodiment can record and reproduce in accordance with the MD-DATA2 format which allows higher density recording than the MD-DATA1 format and also in accordance with the MD audio format and the MD-DATA1 format. First, a disc format which is a medium format of the MD-DATA2 format is described.

Figures 2A, 2B:
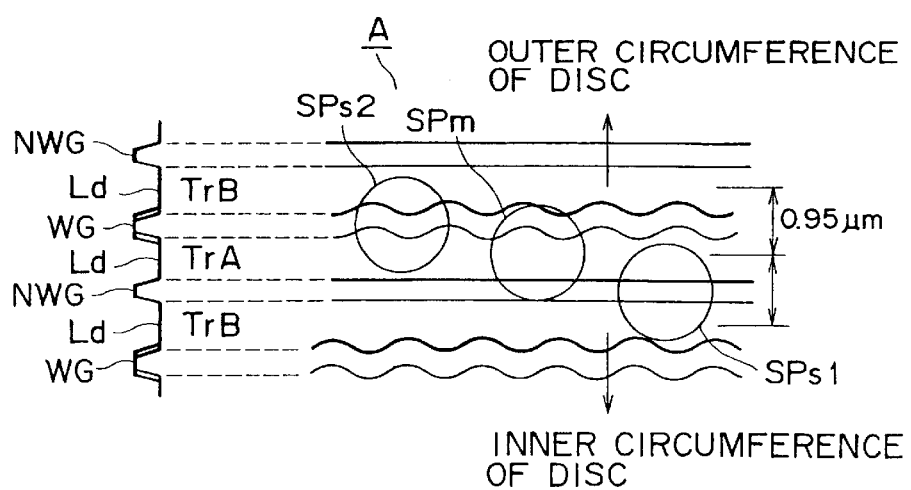
FIGS. 2A and 2B are a cross sectional view and a plan view, respectively, showing the track structure of FIG. 1 in an enlarged scale.

FIGS. 1, 2A and 2B schematically show an example of a track structure of a disc of the MD-DATA2 format. Particularly, FIGS. 2A and 2B are a sectional view and a plan view, respectively, showing a portion surrounded by a broken line A of FIG. 1 in an enlarged scale.

As seen from FIGS. 2A and 2B, on a face of the disc shown, two kinds of grooves including a wobbled groove WG to which wobbles are provided and a non-wobbled groove NWG to which no wobble is provided are formed in advance. The wobbled groove WG and the non-wobbled groove NWG extend such that they may form double spirals on the disc with lands Ld formed between them.

According to the MD-DATA2 format, the lands Ld are utilized as tracks. The wobbled groove WG and the non-wobbled groove NWG are formed in such a manner as described above, and the two tracks Tr*A and Tr*B are formed as double spirals independent of each other.

The track Tr*A is a track with respect to which the wobbled groove WG is positioned on the outer circumference side of the disc and the non-wobbled groove NWG is positioned on the inner circumference side of the disc.

In contrast, the track Tr*B is a track with respect to which the wobbled groove WG is positioned on the inner circumference side of the disc and the non-wobbled groove NWG is positioned on the outer circumference side of the disc.

In other words, it is considered that the track Tr*A has wobbles formed only on a wall face thereof on the outer circumference side of the disc and the track Tr*B has wobbles formed only on a wall face thereof on the inner circumference side of the disc.

In this instance, the track pitch is provided by a distance between the centers of adjacent portions of the track Tr*A and the track Tr*B, and is 0.95 µm as seen from FIG. 2B.

A wobble of the wobbled groove WG are formed based on a signal whose physical address on the disc is encoded by FM (Frequency Modulation) modulation and bi-phase modulation. Accordingly, upon recording or reproduction, a physical address on the disc can be extracted by demodulating reproduction information obtained from the wobble provided to the wobbled groove WG.

Further, address information provided by the wobbled groove WG is effective commonly to the tracks Tr*A and Tr*B. In other words, a portion of the track Tr*A positioned on the inner circumference side and a portion of the track Tr*B positioned on the outer circumference side with respect to a portion of the wobbled groove WG have common address information by a wobble provided to the portion of the wobbled groove WG.

It is to be noted that such an addressing method as described above is also called Interlace addressing method. Where the interlace addressing method is employed, the track pitch can be made small while, for example, crosstalk between adjacent wobbles is suppressed. The system wherein wobbles are formed on a groove to record addresses is called ADIP (Address In Pregroove) method. For the carrier frequency for FM modulation in formation of wobbles, 88.4 kHz is used for the MD-DATA2 format, and 22.05 kHz is used for the MD-DATA1 format.

Further, identification of which one of the tracks Tr*A and Tr*B which commonly have the same address information in such a manner as described above is being traced is performed in the following manner.

For example, where a three-beam method is employed, it is a possible idea to cause, when a main beam is tracing a land Ld serving as a track, the remaining two side beams to trace groove portions positioned on the opposite sides of the track being traced.

FIG. 2B illustrates a condition wherein, as a detailed example, a main beam spot SPm is tracing the track Tr*A. In this instance, of two side beam spots SPs1 and SPs2, the side beam spot SPs1 on the inner circumference side traces the non-wobbled groove NWG while the side beam spot SPs2 on the outer circumference side traces the wobbled groove WG.

In contrast, though not shown, if the main beam spot SPm is tracing the track Tr*B, then the side beam spot SPs1 traces the wobbled groove WG while the side beam spot SPs2 traces the non-wobbled groove NWG.

In this manner, depending upon whether the main beam spot SPm traces the track Tr*A or the track Tr*B, the grooves to be traced by the side beam spots SPs1 and SPs2 are inevitably exchanged between the wobbled groove WG and the non-wobbled groove NWG.

Detection signals obtained by a photo-detector from reflected light from the side beam spots SPs1 and SPs2 exhibit different waveforms depending upon which one of the wobbled groove WG and the non-wobbled groove NWG is being traced. Accordingly, for example, by discriminating which one of the side beam spots SPs1 and SPs2 is tracing the wobbled groove WG or the non-wobbled groove NWG, it can be identified which one of the tracks Tr*A and Tr*B is being traced by the main beam.

FIG. 3 illustrates principal specifications of the MD-DATA2 format having such a track structure as described above in comparison with those of the MD-DATA1 format.

First, according to the MD-DATA1 format, the track pitch is 1.6 µm, and the bit length is 0.59 µm/bit. Further, the laser wavelength $\lambda$ is $\lambda$=780 nm, and the numerical aperture NA of the optical head is NA=0.45.

For the recording method, the groove recording method is employed. In short, grooves are used as tracks for recording and reproduction.

For the addressing method, a method which makes use of a wobbled groove formed by forming wobbles as address information on the opposite sides of a groove formed as a single spiral groove is employed.

For the modulation method for recording data, the EFM (eight to fourteen modulation) method is employed. Further, for the error correction method, the ACIRC (Advanced Cross Interleave Reed-Solomon Code) is adopted, and convolution type data interleaving is employed for the data interleave. Consequently, the redundancy of data is 46.3%.

Further, in the MD-DATA1 format, the CLV (Constant Linear Velocity) is adopted for the disc driving method, and the linear velocity of the CLV is 1.2 m/s.

Furthermore, the standard data rate upon recording or reproduction is 133 kB/s, and the recording capacity is 140 MB.

In contrast, according to the MD-DATA2 format which can be used by the video camera in the present embodiment, the track pitch is 0.95 µm, and the bit length is 0.39 µm/bit. Thus, it can be seen that both of the track pitch and the bit length are shorter than those of the MD-DATA1 format. Further, in order to realize, for example, the bit length given above, the laser wavelength $\lambda$ is $\lambda$=650 nm, and the numerical aperture NA of the optical head is NA=0.52. Thus, the beam spot diameter at the focused position is reduced and the band of the optical system is widened.

For the recording method, the land recording method is employed as described hereinabove with reference to FIGS. 1 and 2, and for the addressing method, the interlace addressing method is employed. Further, for the modulation method of recording data, the RLL (1, 7) method (RLL: Run Length Limited) which is suitable for high density recording is employed, and for the error correction method, the RS-PC (Reed-Solomon Product Code) method is adopted and block closing type data interleaving is employed for the data interleave. As a result of the employment of the methods described above, the redundancy of data can be suppressed to 19.7%.

Also in the MD-DATA2 format, the CLV is adopted for the disc driving method, and the linear velocity of the CLV is 2.0 m/s. The standard data rate upon recording or reproduction is 589 kB/s. Consequently, a recording capacity of 650 MB can be achieved. According, when compared with the MD-DATA1 format, recording of a higher density by more than four times is realized.

For example, if recording of moving pictures is performed in accordance with the MD-DATA2 format, where compression coding according to the MPEG2 (Moving Picture image coding Experts Group 2) is performed for moving picture data, moving pictures for a period of time of 15 to 17 minutes can be recorded although it depends upon the bit rate of coded data. Further, if only audio signal data are to be recorded, where compression coding according to the ATRAC2 (Adaptive Transform Acoustic Coding 2) is performed for the audio data, recording for a time of approximately 10 hours can be performed.

2. Appearance construction of video camera

FIGS. 6A, 6B and 6C are a side elevational view, a plan view and a rear elevational view, respectively, showing an example of an appearance of the video camera in the present embodiment.

Referring to FIGS. 6A, 6B and 6C, a camera lens 201 including an imaging lens and a diaphragm to be used for imaging is provided in an exposed condition on a body 200 of the video camera in the present embodiment. Further, a pair of microphones 202 for collecting sound in stereo from the outside upon imaging are provided at top portions of the body 200 as seen in FIG. 6B. In other words, the video camera can perform recording of an image imaged by the camera lens 201 and recording of a stereo audio signal collected by the microphones 202.

Further, a display section 6A, a speaker 205 and an indicator 206 are provided on a side face of the body 200. The display section 6A displays an imaged image, an image reproduced by the internal recording and reproduction apparatus and so forth thereon. It is to be noted that, as a display device adopted for the display section 6A, for example, a liquid crystal display unit or the like is used though not specifically limited to this. Further, the display section 6A displays a message composed of letters or characters for informing a user of required information in response to an operation of the apparatus.

The speaker 205 outputs, upon reproduction of a recorded audio signal, the thus reproduced audio signal. Further, the speaker 205 outputs required message sound of, for example, beep sound or the like.

The indicator 206, for example, emits light during a recording operation to inform a user that the video camera is performing a recording operation.

A viewfinder 204 is provided on a rear face of the body 200 as shown in FIG. 6C and displays an image fetched from the camera lens 201, a character image or the like during a recording operation or in a standby mode. A user can perform imaging while observing the viewfinder 204.

Further, a disc slot 203, a video output terminal T1, a headphone and line terminal T2, and an I/F (interface) terminal T3 are provided on the rear face of the body 200. The disc slot 203 is a slot through which a disc serving as a recording medium which can be used with the video camera in the present embodiment is loaded into or unloaded from the body 200. The video output terminal T1 is a terminal from which a reproduced image signal, a character image signal or the like to an external video apparatus, and the headphone and line terminal T2 is a terminal from which a reproduced audio signal is outputted to an external audio apparatus or a headphone. The I/F terminal T3 is an interface input/output terminal through which data is communicated with, for example, an external data apparatus.

Further, various operation members 300, 301 and 304 to 309 to be manually operated by a user are provided at different locations of the body 200.

The main dial 300 is an operation switch for setting power supply on/off, a recording operation or a reproduction operation of the video camera. When the main dial 300 is at the "OFF" position as seen in FIG. 6C, the power supply to the video camera is off, and when the main dial 300 is turned to the "STBY" position, the power supply is made available and the video camera enters a standby condition for a recording operation. On the other hand, if the main dial 300 is turned to the "PB" position, then the power supply is made available and the video camera enters a standby condition for a reproduction operation.

The release key 301 functions as an operation key for starting of recording or for a recording shutter when the video camera is in a recording standby condition.

It is to be noted that, in a modification which will be hereinafter described, when the release key 301 is depressed, a pressure level which is a strength with which the release key 301 is depressed is detected, and the data rate of compressed image data to be recorded onto a disc is varied in response to the pressure level.

The zoom key 304 is an operation key for operating a zoom condition between a telescopic condition and a wide condition upon imaging.

The eject key 305 is an operation key for unloading a disc loaded in the disc slot 203.

The reproduction and pause key 306, stop key 307, forward search key 308 and reverse search key 309 are prepared for various operations upon reproduction from a disc.

It is to be noted that the appearance of the video camera shown in FIGS. 6A, 6B and 6C is a mere example at all and may be modified or varied suitably in accordance with conditions of use required for the video camera to which the present invention is applied. Naturally, the kinds and operation manners of the operation keys and the connection terminals to external apparatus may have various forms.

3. Internal construction of video camera

Figure 4A:
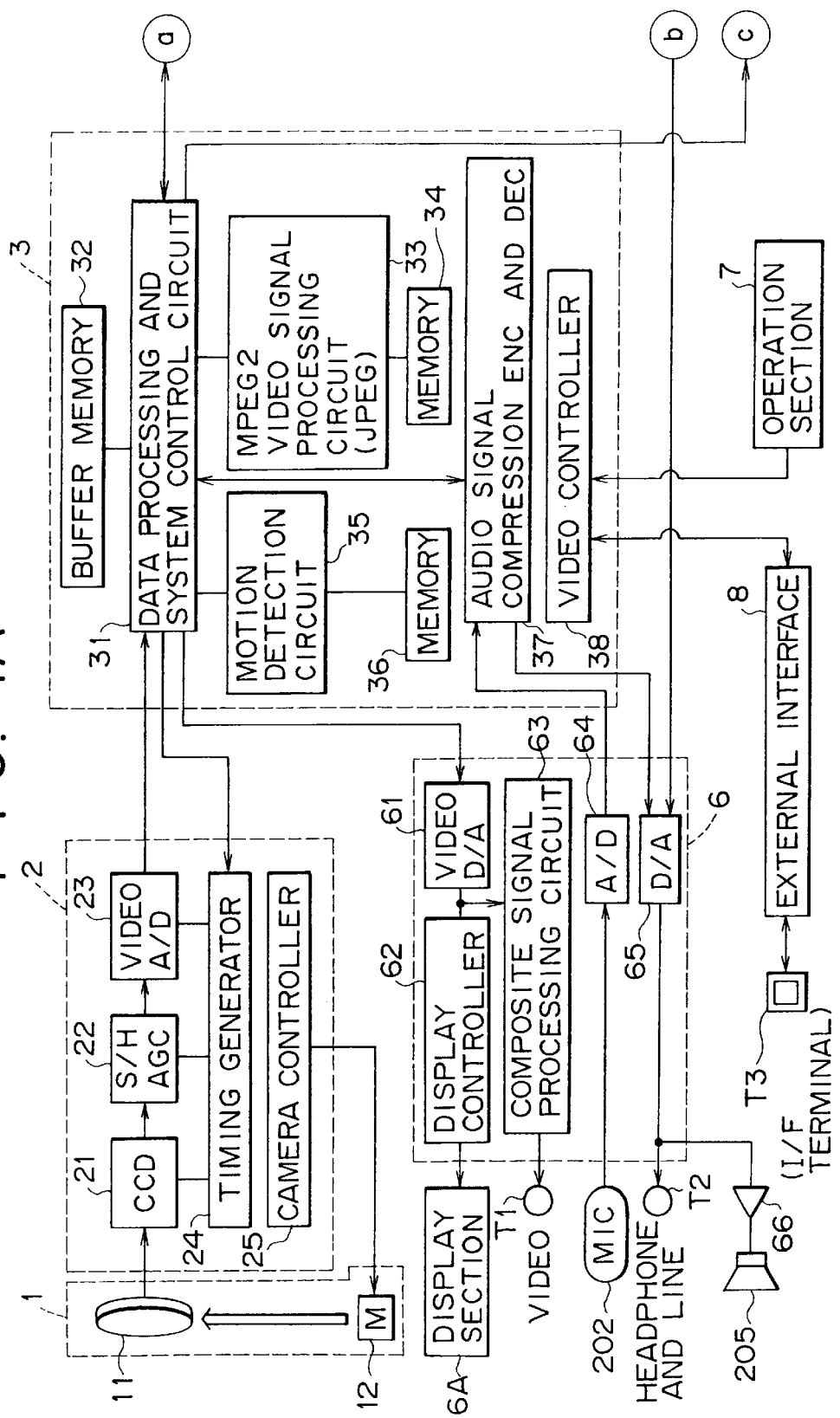
FIG. 4 is a block diagram showing an internal structure of a video camera to which the present invention is applied.

FIG. 4 is a block diagram showing an example of an internal construction of the video camera in the present embodiment.

Referring to FIG. 4, a lens block 1 shown actually includes, for example, an optical system 11 composed of an imaging lens, a diaphragm and other necessary elements. The camera lens 201 described hereinabove with reference to FIGS. 6A to 6C is included in the optical system 11. Further, the lens block 1 includes a motor section 12 which in turn includes a focusing motor for performing an automatic focusing operation of the optical system 11 and a zooming motor for moving a zoom lens in response to an operation of the zoom key 304.

A camera block 2 principally includes a circuit section for converting image light imaged by the lens block 1 into a digital image signal.

A light image of an imaging object which passes through the optical system 11 is provided to a CCD (Charge Coupled Device) 21 of the camera block 2. The CCD 21 performs photoelectric conversion of the light image to produce an imaged signal and supplies the imaged signal to a sample hold and AGC (Automatic Gain Control) circuit 22. The sample hold and AGC circuit 22 performs gain adjustment and sample holding processing for the imaged signal outputted from the CCD 21 to waveform shape the imaged signal. An output of the sample hold and AGC circuit 22 is supplied to a video A/D converter 23, by which it is converted into digital image signal data.

Signal processing timings of the CCD 21, sample hold and AGC circuit 22 and video A/D converter 23 are controlled with timing signals produced by a timing generator 24. The timing generator 24 receives a clock which is utilized for signal processing by a data processing and system control circuit 31 in a video signal processing circuit 3 and produces required timing signals based on the clock so that signal processing timings of the camera block 2 are synchronized with processing timings of the video signal processing circuit 3.

A camera controller 25 executes required control so that the above-described functioning circuit sections provided in the camera block 2 may operate appropriately, and executes control for automatic focusing, automatic exposure adjustment, diaphragm adjustment, zooming and so forth for the lens block 1.

For example, in automatic focusing control, the camera controller 25 controls the angle of rotation of the focusing motor based on focusing control information obtained in accordance with a predetermined automatic focusing control method. Accordingly, the imaging lens is driven into a just focused condition.

Upon recording, the video signal processing circuit 3 performs compression processing for a digital image signal supplied thereto from the camera block 2 and a digital audio signal obtained by collection of sound by means of the microphones 202 and supplies resulting compressed data as user recording data to a medium driving section 4. Further, the video signal processing circuit 3 supplies an image produced from the digital image signal supplied from the camera block 2 and a character image to a viewfinder driving section 207 so that it may be displayed in the viewfinder 204.

On the other hand, upon reproduction, the video signal processing circuit 3 performs demodulation processing for user reproduction data read out from a disc 51 and supplied from the medium driving section 4, that is, compressed image signal data and audio signal data, and outputs demodulated image and audio signal data as a reproduction image signal and a reproduction audio signal, respectively.

It is to be noted that, in the present embodiment, as a compression and decompression processing method for image signal data, the MPEG2 (Moving Picture Experts Group 2) is used for moving pictures, and the JPEG (Joint Photographic Coding Experts Group) is used for still pictures. Meanwhile, as a compression and decompression processing method for audio signal data, the ATRAC2 (Adaptive Transform Acoustic Coding 2) is used.

The data processing and system control circuit 31 of the video signal processing circuit 3 principally executes control processing regarding compression and decompression processing of image signal data and audio signal data of the video signal processing circuit 3 and processing for controlling inputting/outputting of data through the video signal processing circuit 3.

Further, controlling processing of the entire video signal processing circuit 3 including the data processing and system control circuit 31 is executed by a video controller 38. The video controller 38 includes, for example, a microcomputer and so forth and can communicate with the camera controller 25 of the camera block 2 and a driver controller 46 of the medium driving section 4, which will be hereinafter described, for example, over a bus line or the like not shown.

As basic operations of the video signal processing circuit 3 upon recording, image signal data supplied from the video A/D converter 23 of the camera block 2 is inputted to the data processing and system control circuit 31. The data processing and system control circuit 31 supplies the inputted image signal data, for example, to a motion detection circuit 35. The motion detection circuit 35 performs image processing such as motion compensation for the inputted image signal data using, for example, a memory 36 as a working area, and supplies resulting image signal data to an MPEG2 video signal processing circuit 33.

The MPEG2 video signal processing circuit 33 uses, for example, a memory 34 as a working area to perform compression processing of the inputted image signal data in accordance with a format of the MPEG2 and outputs a bit stream of the MPEG2 of compressed data as moving pictures. Further, for example, when image data as a still picture is to be extracted from image signal data as moving pictures and compression processing is to be performed for the image data, the MPEG2 video signal processing circuit 33 produces compressed image data as a still picture in accordance with a format of the JPEG. It is to be noted that, where compressed image data according to a format not of the JPEG but of the MPEG2 is employed, an I picture (Intra-Picture) which is normal image data may possibly be handled as image data of a still picture.

The compressed image signal data compression coded by the MPEG2 video signal processing circuit 33 is written at a predetermined transfer rate into and temporarily held by, for example, a buffer memory 32.

It is to be noted that, in a format of the MPEG2, as well known in the art, both of the CBR (Constant Bit Rate) and the VBR (Variable Bit Rate) are supported as a coding bit rate, and the video signal processing circuit 3 can cope with them.

For example, when image compression processing according to the VBR is to be performed, for example, the motion detection circuit 35 performs motion detection from image data in units of a micro block within a range of several tens to several hundreds frames in sequence, and transmits, if some motion is detected, the result of detection as motion vector information to the MPEG2 video signal processing circuit 33.

The MPEG2 video signal processing circuit 33 makes use of required information including the motion vector information to successively determine quantization coefficients of the individual blocks so that the data rate of image data after they are compression coded may be a certain required data rate.

An audio signal of sound collected, for example, by the microphones 202 is inputted as digital audio signal data to an audio signal compression encoder and decoder 37 through an A/D converter 64 in a display, image and audio signal inputting and outputting section 6.

The audio signal compression encoder and decoder 37 performs compression processing for the audio signal data inputted thereto in accordance with the format of the ATRAC as described above. Also the compressed audio signal data is written into the buffer memory 32 at a predetermined transfer rate by the data processing and system control circuit 31 and temporarily held by the buffer memory 32.

Compressed image data and compressed audio signal data can be stored into the buffer memory 32 in such a manner as described above. The buffer memory 32 principally has a function of absorbing a difference in rate between the data transfer rate between the camera block 2 or the display, image and audio signal inputting and outputting section 6 and the buffer memory 32 and the data transfer rate between the buffer memory 32 and the medium driving section 4.

The compressed image data and the compressed audio signal data stored in the buffer memory 32 are, upon recording, successively read out at predetermined timings and transmitted to an MD-DATA2 encoder and decoder 41 of the medium driving section 4. However, for example, upon reproduction, reading out of data stored in the buffer memory 32 and operation for recording the read out data onto the disc 51 through the medium driving section 4 and a deck section 5 may be performed intermittently.

Such writing and reading out control of data into and from the buffer memory 32 is executed, for example, by the data processing and system control circuit 31.

Operation of the video signal processing circuit 3 upon reproduction is generally such as follows.

Upon reproduction, compressed image data read out from the disc 51 and decoded in accordance with the MD-DATA2 format by processing of the MD-DATA2 encoder and decoder 41 in the medium driving section 4 and compressed audio signal data which is user reproduction data are transmitted to the data processing and system control circuit 31.

The data processing and system control circuit 31 stores the compressed image data and compressed audio signal data inputted thereto once, for example, into the buffer memory 32. Then, the data processing and system control circuit 31 reads out the compressed image data and the compressed audio signal data from the buffer memory 32, for example, at a required timing matched in a reproduction time axis and at a required transfer rate, and supplies the compressed image data to the MPEG2 video signal processing circuit 33 and supplies the compressed audio signal data to the audio signal compression encoder and decoder 37.

The MPEG2 video signal processing circuit 33 performs decompression processing for the inputted compressed image data and transmits resulting image data to the data processing and system control circuit 31. The data processing and system control circuit 31 supplies the decompressed image signal data to a video D/A converter 61 in the display, image and audio signal inputting and outputting section 6.

Meanwhile, the audio signal compression encoder and decoder 37 performs decompression processing for the compressed audio signal data inputted thereto and supplies the decompressed audio signal data to a D/A converter 65 in the display, image and audio signal inputting and outputting section 6.

In the display, image and audio signal inputting and outputting section 6, the image signal data inputted to the video D/A converter 61 is converted into an analog image signal by the video D/A converter 61 and are inputted to a display controller 62 and a composite signal processing circuit 63.

The display controller 62 drives the display section 6A in accordance with the image signal inputted thereto so that a reproduction image is displayed on the display section 6A. Not only an image obtained by reproduction from the disc 51, but also an imaged image obtained by imaging by means of the camera section including the lens block 1 and the camera block 2 can be displayed substantially on the real time basis on the display section 6A.

Further, in addition to such a reproduction image and an imaged image as described above, also a message composed of letters, characters and so forth for informing the user of particular information in response to an operation of the apparatus is displayed as described hereinabove. Such message display as just described may be realized, for example, by executing, under the control of the video controller 38, processing of composing image signal data such as required letters or characters with image signal data to be outputted from the data processing and system control circuit 31 to the video D/A converter 61 so that the required letters, characters and so forth may be displayed at predetermined positions.

The composite signal processing circuit 63 converts the analog image signal supplied thereto from the video D/A converter 61 into a composite signal and outputs the composite signal to the video output terminal T1. If the video camera is connected, for example, to an external monitor unit or the like through the video output terminal T1, then an image reproduced by the video camera can be displayed on the external monitor unit.

Meanwhile, audio signal data inputted from the audio signal compression encoder and decoder 37 to the D/A converter 65 in the display, image and audio signal inputting and outputting section 6 is converted into an analog audio signal by the D/A converter 65 and outputted to the headphone and line terminal T2. Further, since the analog audio signal outputted from the D/A converter 65 is outputted also to a speaker SP through an amplifier 66, reproduction sound or the like is outputted from the speaker SP.

The medium driving section 4 principally encodes, upon recording, recording data so that the recording data may be suitable for recording onto a disc in accordance with the MD-DATA2 format or the MD-DATA1 format, and transmits the encoded data to the deck section 5. However, upon reproduction, the medium driving section 4 performs decoding processing for data read out from the disc 51 by the deck section 5 to obtain reproduction data and transmits the reproduction data to the video signal processing circuit 3.

The MD-DATA2 encoder and decoder 41 of the medium driving section 4 receives, upon recording, recording data which include compressed image data and compressed audio signal data from the data processing and system control circuit 31, performs predetermined encoding processing for the received recording data in accordance with the MD-DATA2 format, and temporarily stores the encoded data into a buffer memory 42. Then, the MD-DATA2 encoder and decoder 41 reads out the encoded data at required timings from the buffer memory 42 and transmits them to the deck section 5.

Upon reproduction, the MD-DATA2 encoder and decoder 41 performs decoding processing in accordance with the MD-DATA2 format or the MD-DATA1 format for a digital reproduction signal read out from the disc 51 and inputted thereto through an A/D converter 43 and an RF (Radio Frequency) signal processing circuit 44, and transmits the decoded digital reproduction signal as reproduction data to the data processing and system control circuit 31 of the video signal processing circuit 3.

It is to be noted that, also in this instance, if necessary, the reproduction data are stored once into the buffer memory 42, and data read out at required timings from the buffer memory 42 are transmitted to the data processing and system control circuit 31. Such writing and reading out control for the buffer memory 42 as described above is executed by the driver controller 46.

It is to be noted that, even in such a case wherein, for example, upon playing back of the disc 51, a servo system or the like is disordered by a disturbance or the like and reading out of a signal from the disc 51 is disabled, if a reproduction operation for the disc 51 is re-established within a time corresponding to the read out data stored in the buffer memory 42, then the continuity in time series of the reproduction data can be maintained.

In the present embodiment, an optical detection signal in the form of current obtained by the photo-detector of an optical head 53 of the deck section 5 which receives laser light irradiated upon and reflected from the disc 51 is outputted as an analog signal as a result of current to voltage conversion (hereinafter referred to simply as I-V conversion) by the optical head 53 side.

In the medium driving section 4 in the present embodiment, the optical detection signal in the form of a voltage is converted from an analog signal into a digital signal by the A/D converter 43. Then, the optical detection signal in the form of a digital signal is supplied to the RF signal processing circuit 44.

The RF signal processing circuit 44 performs required digital signal processing for the optical detection signal inputted thereto to produce, for example, an RF signal as reproduction data, and servo control signals such as a focusing error signal and a tracking error signal for servoing control to the deck section 5. The RF signal is inputted to an MD-DATA2 encoder and decoder 41.

Meanwhile, the servo control signals produced by the RF signal processing circuit 44 are supplied to a servo circuit 45. The servo circuit 45 executes required servoing control of the deck section 5 based on the servo control signals inputted thereto.

In the present embodiment, the video camera includes an encoder and decoder 47 for the MD-DATA1 format so that recording data supplied from the video signal processing circuit 3 may be encoded in accordance with the MD-DATA1 format and recorded onto the disc 51, or, where data read out from the disc 51 are data encoded in accordance with the MD-DATA1 format, decoding processing of the data is performed and resulting data can be outputted to the video signal processing circuit 3. In short, the video camera in the present embodiment is constructed so as to be compatible with both of the MD-DATA2 format and the MD-DATA1 format.

The driver controller 46 is a functioning circuit section for generally controlling the medium driving section 4.

The deck section 5 is a section which includes mechanisms for driving the disc 51. Though not shown in FIG. 4 but shown in FIG. 6C, the deck section 5 can unloadably receive a disc 51 and includes a mechanism which allows exchanging of the disc 51 by an operation of a user, that is, the disc slot 203. Further, the disc 51 here is presupposed to be a magneto-optical disc which matches with the MD-DATA2 format or the MD-DATA1 format.

In the deck section 5, the disc 51 loaded is driven to rotate at a CLV by a spindle motor 52 which is driven to rotate at a CLV. Upon recording or reproduction, laser light is irradiated upon the disc 51 by the optical head 53.

The optical head 53 outputs, upon recording, laser light of a high level necessary to heat a recording track to its Curie temperature, but outputs, upon reproduction, laser light of a comparatively low level sufficient to detect data from reflected light by a magnetic Kerr effect. To this end, the optical head 53 includes a laser diode serving as laser outputting means, an optical system including a polarizing beam splitter, an objective lens and so forth and a detector for detecting reflected light though not particularly shown in FIG. 4. The objective lens provided in the optical head 53 is held for movement in a radial direction of the disc and in a direction toward or away from the disc, for example, by a 2-axis mechanism.

A magnetic head 54 is disposed at a position opposing to the optical head 53 across the disc 51. The magnetic head 54 applies a magnetic field modulated in accordance with recording data to the disc 51.

Further, though not shown, the deck section 5 includes a sled mechanism driven by a sled motor 55. As the sled mechanism is driven, the entire optical head 53 and the magnetic head 54 can be moved in a radial direction of the disc.

An operation section 7 corresponds to the operation keys 300 to 310 and so forth shown in FIG. 6C, and operation information of any of the operation keys by a user is supplied, for example, to the video controller 38. The video controller 38 supplies operation information and control information for causing necessary operations corresponding to an operation by the user to be performed by pertaining sections to the camera controller 25 and the driver controller 46.

An external interface 8 is provided to allow communication of data between the video camera and an external apparatus and is provided, for example, between the I/F (interface) terminal T3 and the video signal processing circuit as seen in FIG. 4. It is to be noted that, while the external interface 8 is not specifically restricted here, for example, an IEEE 1394 interface or the like may be adopted.

For example, where an external digital image apparatus and the video camera in the present embodiment are interconnected through the I/F terminal T3, an image imaged by the video camera or an audio signal can be recorded into the external digital image apparatus. Further, where image or audio signal data or the like reproduced by an external digital image apparatus is taken in through the external interface 8, it can be recorded onto the disc 51 in accordance with the MD-DATA2 format or the MD-DATA1 format.

A power supply block 9 makes use of dc power supply obtained from a built-in battery or dc power supply produced from commercial ac power supply to supply required power supply voltages to the functioning circuit sections. The power supply on and off operation of the power supply block 9 is controlled by the video controller 38 in response to an operation of the main dial 300 described hereinabove.

Further, during recording operation, the video controller 38 controls the indicator 206 to execute its lighting operation.

4. Construction of medium driving section

Subsequently, a detailed construction of functioning circuit sections for the MD-DATA2 format extracted from the construction of the medium driving section 4 shown in FIG. 4 is described with reference to a block diagram of FIG. 5. It is to be noted that, while the deck section 5 is shown together with the medium driving section 4 in FIG. 5, since the internal construction of the deck section 5 is described above with reference to FIG. 4, overlapping description of it is omitted here to avoid redundancy.

In the present embodiment, an optical detection signal in the form of current outputted from the photo-detector of the optical head 53 is converted into another optical detection signal in the form of a voltage by a current to voltage converter provided in the optical head 53 and is outputted to the medium driving section 4 after its noise resisting property is reinforced. It is to be noted that the construction of the optical detection signal outputting circuit which includes the photo-detector and the current to voltage converter of the optical head 53 is hereinafter described.

The optical detection signal in the form of a voltage of an analog signal inputted to the medium driving section 4 is converted into a digital signal by the A/D converter 43. A digital output of the A/D converter 43 is supplied to an RF amplifier 101 and a matrix amplifier 107 in the RF signal processing circuit 44.

The RF amplifier 101 performs digital signal processing to produce a reproduction RF signal (binary digitized RF signal) in the form of a digital signal from the optical detection signal inputted thereto.

The binary digitized RF signal is supplied to the MD-DATA2 encoder and decoder 41, in which gain adjustment, clamping processing and so forth are performed by an AGC and clamping circuit 103, and a resulting signal is inputted to an equalizer and PLL (Phase Locked Loot) circuit 104.

The equalizer and PLL circuit 104 performs equalization processing for the binary digitized RF signal inputted thereto and outputs a resulting signal to a Viterbi decoder 105. Further, the binary digitized RF signal after the equalization processing is inputted to a PLL circuit, by which a clock CLK synchronized with the binary digitized RF signal (RLL (Run Length Limited) (1, 7) code train) is extracted.

The frequency of the clock CLK corresponds to the speed of rotation of the disc at present. Therefore, a CLV processor 111 receives the clock CLK from the equalizer and PLL circuit 104, compares the clock CLK with a reference value which corresponds to a predetermined CLV velocity illustrated in FIG. 3 to obtain error information, and utilizes the error information as a signal component for production of a spindle error signal SPE. Further, the clock CLK is used as a clock for required processing of the signal processing circuit systems beginning with, for example, an RLL (1, 7) demodulation circuit 106.

The Viterbi decoder 105 performs decoding processing in accordance with a Viterbi decoding method for the binary digitized RF signal inputted thereto from the equalizer and PLL circuit 104. Consequently, reproduction data in the form of an RLL (1, 7) code train are obtained.

The reproduction data are inputted to the RLL (1, 7) demodulation circuit 106, by which a data stream for which RLL (1, 7) demodulation has been performed is obtained.

The data stream obtained by the demodulation processing of the RLL (1, 7) demodulation circuit 106 is written into the buffer memory 42 through a data bus 114 so that it is expanded on the buffer memory 42.

The data stream expanded on the buffer memory 42 first undergoes error correction processing in units of an error correction block in accordance with the RS-PC (Reed-Solomon Product Code) method by an ECC (Error Correction Code) processing circuit 116, and then undergo descramble processing and EDC decoding processing, that is, error detection processing, by a descramble and EDC (Error Detect Code) decoding circuit 117.

The data obtained by such processing as described above are reproduction data DATAP. The reproduction data DATAP are transmitted, for example, from the descramble and EDC decoding circuit 117 to the data processing and system control circuit 31 of the video signal processing circuit 3 at a transfer rate in accordance with the transfer clock generated by a transfer clock generation circuit 121.

The transfer clock generation circuit 121 is a section which uses, for example, quartz to generate a transfer clock of an appropriate frequency, that is, a data transfer rate, when transfer of data between the medium driving section 4 and the video signal processing circuit 3 or transfer of data between different functioning circuit sections in the medium driving section 4 is to be performed.

Further, the transfer clock generation circuit 121 generates clocks of required frequencies to be supplied to the functioning circuit sections of the medium driving section 4 and the video signal processing circuit 3 in response to an operation condition of the video camera.

The matrix amplifier 107 performs required calculation processing by digital signal processing for the optical detection signal inputted thereto to extract a tracking error signal TE, a focusing error signal FE, groove information GFM (Groove Frequency Modulation) which is an information signal including absolute address information recorded as the wobbled groove WG on the disc 51, and so forth and supplies them to the servo circuit 45. In particular, the tracking error signal TE and focusing error signal FE extracted in this manner are supplied to a servo processor 112, and the groove information GFM is supplied to an ADIP band-pass filter 108.

It is to be noted that, while, as described hereinabove, the present embodiment is compatible with both of the MD-DATA1 format and the MD-DATA2 format, in a corresponding relationship to this, required signal processing of the matrix amplifier 107 is controlled by the driver controller 46 so that the operation of the matrix amplifier 107 may be switched depending upon whether the format of a disc which makes an object of recording or reproduction is the MD-DATA1 format or the MD-DATA2 format. This will be hereinafter described.

The groove information GFM band limited in accordance with a frequency of the wobbles by the ADIP band-pass filter 108 is supplied to an A or B track detection circuit 109 and an ADIP decoder 110.

The A or B track detection circuit 109 discriminates, for example, based on the method described hereinabove with reference to FIG. 2B from the groove information GFM inputted thereto whether the track being traced at present is the track TR*A or the track TR*B, and outputs a result of the discrimination as track discrimination information to the driver controller 46. Meanwhile, the ADIP decoder 110 performs FM demodulation processing and required decoding processing for the groove information GFM inputted thereto to extract an ADIP signal which is absolute address information on the disc, and outputs the ADIP signal to the driver controller 46. The driver controller 46 executes required controlling processing based on the track discrimination information and the ADIP signal.

To the CLV processor 111, the clock CLK from the equalizer and PLL circuit 104 and the ADIP signal obtained by the ADIP decoder 110 are inputted.

The CLV processor 111 utilizes, for example, signals inputted thereto in such a manner as described above to produce a spindle error signal SPE for CLV servo control based on an error signal obtained by integration of a phase error of the ADIP signal from the clock CLK, and outputs the spindle error signal SPE to the servo processor 112. In this instance, depending upon the construction of the CLV processor 111, also an error signal component obtained by comparison between the frequency of the ADIP signal and a target value corresponding to a predetermined CLV velocity is utilized as a component of the spindle error signal SPE. It is to be noted that required operation to be executed by the CLV processor 111 is controlled by the driver controller 46.

The servo processor 112 produces a tracking control signal, a focusing control signal, a sled control signal, a spindle control signal and some other servo control signals based on the tracking error signal TE, focusing error signal FE and spindle error signal SPE inputted thereto in such a manner as described above and a track jumping instruction, an accessing instruction and so forth from the driver controller 46, and outputs the thus produced control signals to a servo driver 113.

The servo driver 113 produces required servo drive signals based on the servo control signals supplied thereto from the servo processor 112. The servo drive signals include two 2-axis drive signals for driving the two-axis mechanism for a focusing direction and a tracking direction, a sled motor driving signal for driving the sled mechanism, and a spindle motor driving signal for driving the spindle motor 52.

Since such servo drive signals as described above are inputted to the deck section 5, focusing control and tracking control for the disc 51 and CLV control for the spindle motor 52 are performed.

When a recording operation to the disc 51 is to be performed, for example, recording data DATAr are inputted from the data processing and system control circuit 31 of the video signal processing circuit 3 to a scramble and EDC encoding circuit 115. The recording data DATAr are inputted, for example, in synchronism with a transfer clock of the data transfer rate generated by the transfer clock generation circuit 121.

The scramble and EDC encoding circuit 115 writes and expands the recording data DATAr, for example, into and on the buffer memory 42 and performs data scrambling processing and EDC encoding processing, which is processing of adding an error detection code in accordance with a predetermined method, for the recording data DATAr. After this processing, error correction codes according to the RS-PC system are added to the recording data DATAr expanded in the buffer memory 42, for example, by the ECC processing circuit 116.

The recording data DATAr processed in such a manner as described above are read out from the buffer memory 42 and supplied to an RLL (1, 7) modulation circuit 118 over the data bus 114.

The RLL (1, 7) modulation circuit 118 performs RLL (1, 7) modulation processing for the recording data DATAr inputted thereto and outputs recording data in the form of an RLL (1, 7) code train obtained in this manner to a magnetic head driving circuit 119.

By the way, the MD-DATA2 format adopts a laser strobe magnetic field modulation method as a recording method for a disc. The laser strobe magnetic field modulation is a recording method wherein a magnetic field modulated with recording data is applied to a recording face of a disc and laser light to be irradiated upon the disc is emitted in pulses in synchronism with the recording data.

According to the laser strobe magnetic field modulation method described above, the process of formation of a pit edge recorded on a disc does not rely upon a transition characteristic such as a reversing rate of the magnetic field, but is determined by an irradiation timing of a laser pulse.

Consequently, with the laser strobe magnetic field modulation method, when compared with, for example, a simple magnetic field modulation method wherein laser light is irradiated steadily upon a disc and a magnetic field modulated with recording data is applied to a recording face of the disc, it is very easy to considerably reduce jitters of recording pits. In short, the laser strobe magnetic field modulation method is a recording method which is superior in recording of a high density to the simple magnetic field modulation method.

The magnetic head driving circuit 119 of the medium driving section 4 applies a magnetic field modulated with the recording data inputted thereto from the magnetic head 54 to the disc 51. Meanwhile, the RLL (1, 7) modulation circuit 118 outputs a clock synchronized with the recording data to a laser driver 120. The laser driver 120 drives the laser diode of the optical head 53 in response to the clock inputted thereto so that laser pulses synchronized with the recording data generated as a magnetic field by the magnetic head 54 may be irradiated upon the disc. In this instance, the laser pulses emitted and outputted from the laser diode have a required laser power suitable for the recording. Recording operation of the laser strobe magnetic field modulation system can be performed by the medium driving section 4 in the present embodiment in such a manner as described above.

Figure 5A:
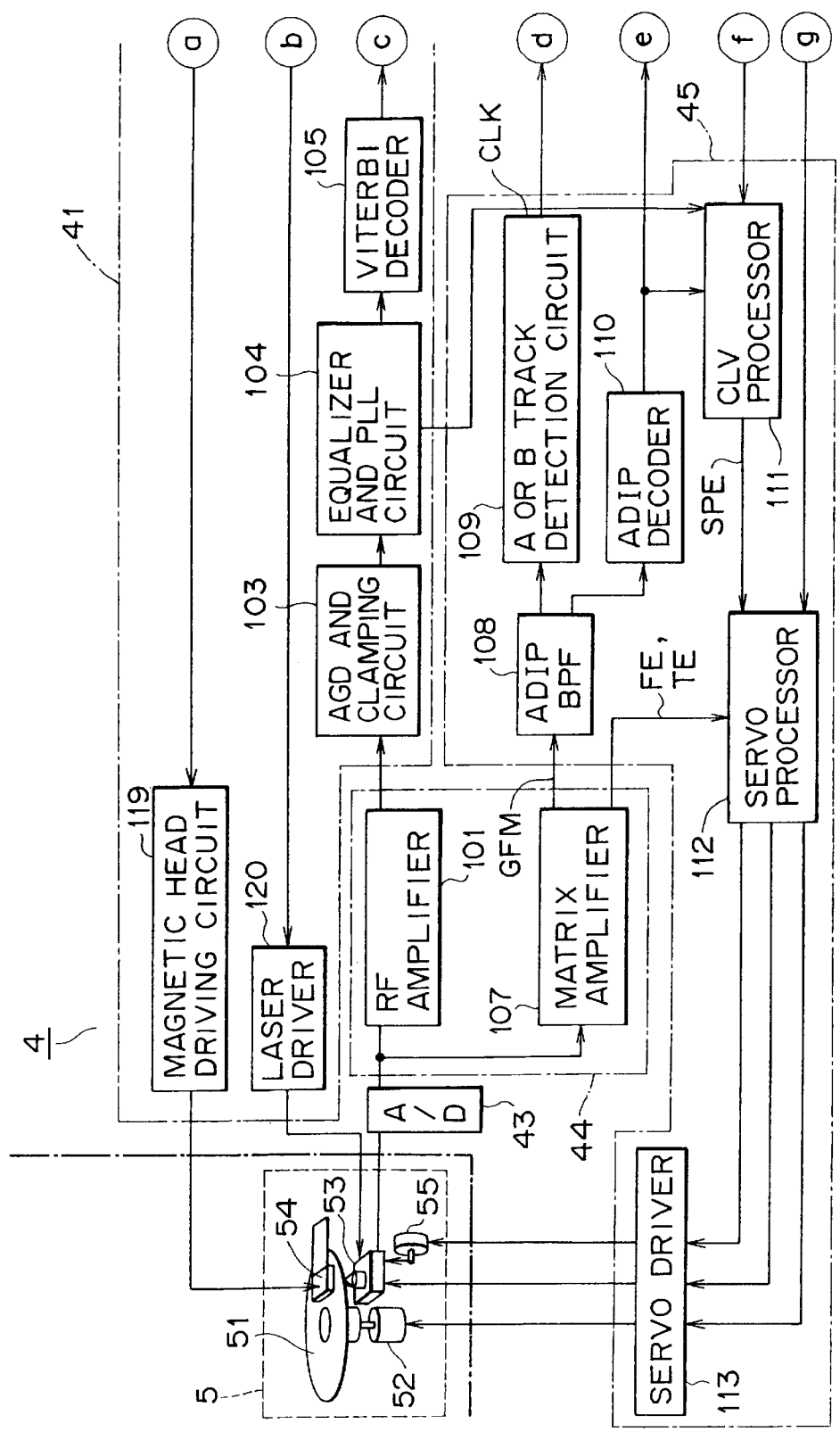
FIG. 5 is a block diagram showing a detailed construction of a medium driving section of the internal structure of the video camera shown in FIG. 4.

It is to be noted that, in the construction of the MD-DATA2 block shown in FIG. 5, the A/D converter 43, the functioning circuit sections which form the RF signal processing circuit 44 and the functioning circuit sections which form the servo circuit 45 except A or B track detection circuit 109 are, in the present embodiment, circuit sections which are commonly used by the MD-DATA1 block for the MD-DATA1 format as can be seen also from the construction shown in FIG. 4.

5. Example of disc structure for use with present embodiment

Subsequently, an example of a structure of the disc 51 for use with the present embodiment is described.

Figure 7:
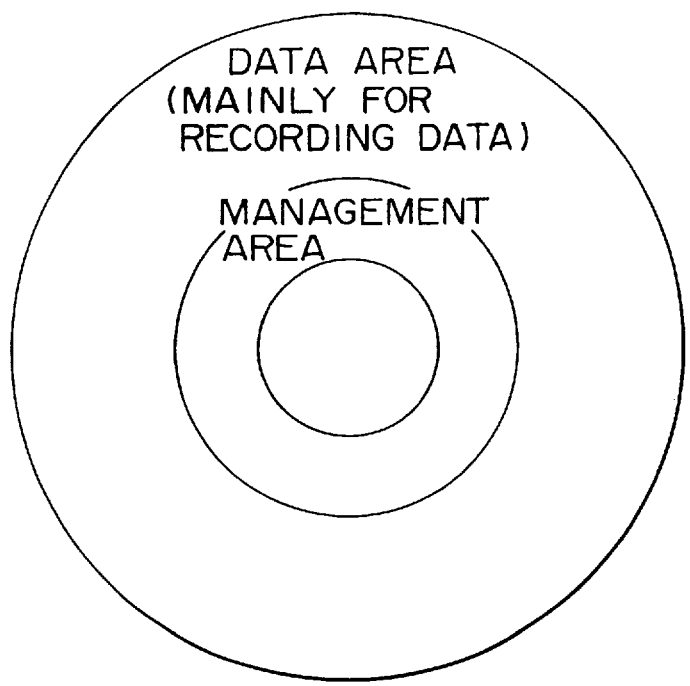
FIG. 7 is a schematic view showing an example of an area for data stored on a disc which can be played back by the video camera shown in FIG. 4.

FIG. 7 illustrates a concept of an example of an area structure of the disc 51 for use with the present embodiment. It is to be noted that the medium format of the disc 51 shown in FIG. 7 is such as described hereinabove with reference to FIGS. 1 and 2.

As seen from FIG. 7, a magneto-optical recording area of the disc 51 into and from which magneto-optical recording and reproduction can be performed has a management area provided in a section of a predetermined size on the innermost circumference side thereof. In the management area, principally required management information called U-TOC (Table Of Contents), that is, user TOC, which is required for management of recording and reproduction of data onto and from the disc is recorded.

For example, in the case of the present embodiment, management information to be used for recording and reproduction in units of a file as data to be recorded onto or reproduced from the disc and data indicating image data positions designated to be displayed as thumbnail images for individual files are stored as the U-TOC.

It is to be noted that the contents of the U-TOC in the management area are rewritten at any time in accordance with a result of recording of data onto the disc till then or a result of editing processing such as deletion of a file.

A data area is provided on the outer circumference side to the management area. Into the data area, principally image data or audio signal data collected by a user, data fetched through the external interface 8 and so forth are recorded.

In this instance, data are recorded into the data area in such a form that they are managed in units of a file. Further, recording or reproduction data of each file is managed based on the U-TOC stored in the management area in such a manner as described above.

The U-TOC recorded in the management area is read out, for example, upon loading of the disc, and is stored into, for example, a predetermined area of the buffer memory 42 of the medium driving section 4 or the buffer memory 32. Then, upon recording of data or upon editing, the U-TOC stored in the buffer memory is rewritten in response to a result of the recording or a result of the editing. Thereafter, at a predetermined opportunity or timing, the U-TOC of the disc 51 is rewritten or updated based on the contents of the U-TOC stored in the buffer memory.

It is to be noted that the example of the structure of the disc shown in FIG. 7 is a mere example at all, and the physical positional relationship of the areas in a radial direction of the disc may be varied in accordance with actual conditions of use and so forth. Further, if necessary, a further area into which some other predetermined kind of data is to be stored may be provided additionally.

6. Construction of optical detection signal processing circuit system 6-1. Construction of photo-detector In the following, a construction of the optical detection signal processing circuit in the present embodiment is described. The optical detection signal processing circuit in the present embodiment includes an optical detection signal outputting circuit which converts reception light current obtained by the photo-detector of the optical head 53 of the deck section 5 into a voltage signal and outputs the voltage signal as an optical detection signal, and an optical detection signal processing circuit system which includes required ones of the functioning circuit sections of the medium driving section 4 including the A/D converter 43, RF signal processing circuit 44, servo circuit 45 and so forth and executes required signal processing for an optical detection signal from the optical detection signal outputting circuit.

Figure 8:
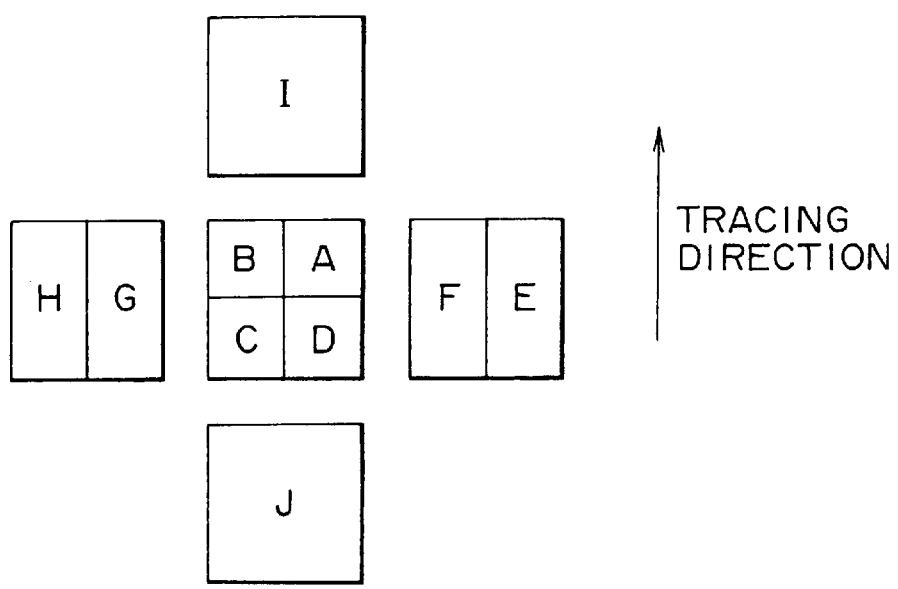
FIG. 8 is a diagrammatic view showing an example of arrangement of a photodetector of an optical head of the video camera shown in FIG. 4.

Thus, a construction of the photo-detector of the optical head 53 which detects reflected light of laser light from a disc is described with reference to FIG. 8.

The photo-detector in the present embodiment is required to have a construction which matches with both of the MD-DATA1 format and the MD-DATA2 format. To this end, the photo-detector includes ten photo-detector elements A, B, C, D, E, F, G, H, I and J arranged in such a manner as seen in FIG. 8.

Upon the photo-detector elements A, B, C and D and the photo-detector element I and the photo-detector element J, a main beam obtained by dividing a laser beam by means of, for example, a Wollaston Prism is irradiated while, upon the photo-detector elements E and F and the photo-detector elements G and H, two split ones of a sub beam obtained by the division described above are irradiated.

It is to be noted that signal processing based on optical detection signals obtained by the photo-detector elements A to J described above is hereinafter described together with a construction of the optical detection signal processing circuit system.

6-2. General construction of optical detection signal processing circuit system

Figure 9:
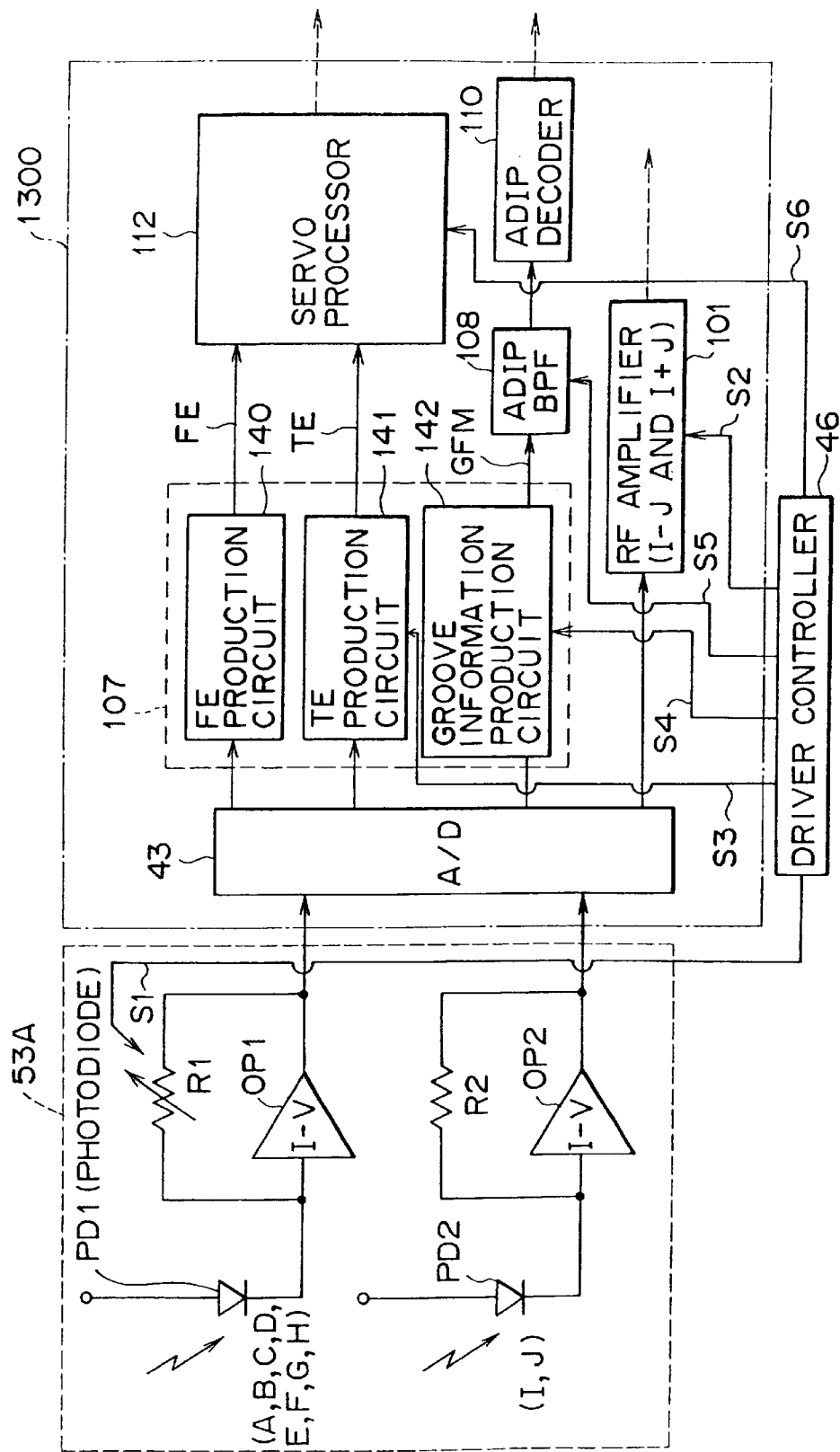
FIG. 9 is a block diagram showing a construction of an optical detection signal processing system of the video camera shown in FIG. 4.

FIG. 9 shows a construction of principal components which form a construction of the entire optical detection signal processing circuit system in the present embodiment. It is to be noted that, in this figure, those functioning circuit sections which correspond to the circuit blocks in FIGS. 4 and 5 are denoted by like reference symbols.

An optical detection signal outputting circuit 53A is a circuit section included in the optical head 53 and outputs detection outputs of the photo-detector elements A to J as optical detection signals each in the form of a voltage signal.

In FIG. 9, photodiodes which form the photo-detector elements A, B, C, D, E, F, G and H are generally indicated as a photodiode PD1 and photodiodes which form the photo-detectors I and J are generally indicated as a photo-diode PD2 for convenience of illustration.

Reception light current obtained by reception of reflected laser light from the disc 51 by the photodiode PD1 is inputted to an current to voltage converter (hereinafter referred to simply as I-V converter) OP1. The I-V converter OP1 converts the inputted reception light current into a voltage signal in accordance with a gain determined by a feedback register R1 and outputs the voltage signal to the A/D converter 43.

Similarly, reception light current obtained by the photodiode PD2 is inputted to another I-V converter OP2, by which it is converted into a voltage signal in accordance with a gain determined by a feedback register R2, and the voltage signal is outputted to the A/D converter 43.

It is to be noted that actually the I-V converter OP1 and the I-V converter OP2 are provided individually for the photo-detector elements A, B, C, D, E, F, G and H and the photo-detector elements I and J, respectively.

The power of laser light to be irradiated upon the disc 51 is set such that, for example, it has different values for recording and reproduction so that they may conform with various conditions upon recording and upon reproduction.

Upon recording onto a magneto-optical disc, in order to raise the temperature of a recording face of the disc to its Curie temperature, a higher laser power than that upon reproduction is required. Accordingly, the reception light current level obtained by a photodiode is different upon recording and upon reproduction.

Consequently, optical detection signals obtained on the photo-detector elements A, B, C, D, E, F, G and H side to be utilized in order to obtain servo control signals and an ADIP signal which is address information must be adjusted so that the levels of them may be equal upon recording and upon reproduction.

To this end, in the present embodiment, for example, the feedback register R1 of the I-V converter OP1 is formed as a variable resistor, and depending upon whether recording should be performed or reproduction should be performed, the resistance value of the feedback register R1 is varied to a required value with a control signal S1 from the driver controller 46 to switch the gain of the I-V converter OP1. In this instance, the resistance value is varied so that the gain upon recording may be lower than the gain upon reproduction.

It is to be noted that, since the photo-detector elements I and J are utilized for production of a reproduction RF signal, that is, since operation of them is rendered effective only upon reproduction, the gain of the I-V converter OP2 which corresponds to the photo-detector elements I and J need not particularly be switched between upon recording and upon reproduction.

However, if the laser power upon recording and the laser power upon reproduction are different between the MD-DATA1 format and the MD-DATA2 format, then it is advisable to construct the optical detection signal outputting circuit 53A such that the resistance values of the feedback register Rl and the feedback register R2 are variably controlled so that gains of the I-V converter OP1 and the I-V converter OP2 corresponding to the laser powers may be obtained.

Optical detection signals of the photo-detector elements A to J outputted from the optical detection signal outputting circuit 53A having such a construction as described above are outputted to the A/D converter 43.

In a stage before the optical detection signals are inputted to the A/D converter 43, they are each in the form of an analog voltage signal. The A/D converter 43 converts the optical detection signals into digital signals and supplies the digital signals to the RF amplifier 101, a focusing error signal FE production circuit 140, a tracking error signal TE production circuit 141 and a groove information production circuit 142 which extracts groove information GFM in accordance with the ADIP method.

The FE production circuit 140, TE production circuit 141 and groove information production circuit 142 are functioning circuit sections which form the matrix amplifier 107 shown in FIG. 5. Further, the matrix amplifier 107 and the RF amplifier 101 are functioning circuit sections included in the RF signal processing circuit shown in FIG. 4.

The FE production circuit 140 makes use of the optical detection signals from the photo-detector elements A, B, C and D to perform calculation processing given by $$(A+B)-(B+D)$$

to produce a focusing error signal FE and supplies the focusing error signal FE to the servo processor 112.

A detection method for a tracking error signal is different between the MD-DATA1 format and the MD-DATA2 format, which will be hereinafter described in detail.

Consequently, the tracking error signal TE production circuit 141 in the present embodiment performs switching of calculation processing for the optical detection signals depending upon whether the applicable format is the MD-DATA1 format or the MD-DATA2 format to produce a tracking error signal. The switching of the calculation processing is controlled with a control signal S3 outputted from the driver controller 46.

The tracking error signal TE outputted from the TE production circuit 141 is supplied to the servo processor 112.

Further, as described hereinabove with reference to FIG. 3, different addressing methods are used for the MD-DATA1 format and the MD-DATA2 format. The MD-DATA1 format employs the single spiral double-sided wobble method while the MD-DATA2 format employs the interlace addressing method.

Therefore, the groove information production circuit 142 performs switching of the calculation processing for the individual optical detection signals depending upon whether the disc 51 has the MD-DATA1 format or the MD-DATA2 format so that groove information GFM matching with each format may be extracted appropriately.

The groove information GFM obtained by the groove information production circuit 142 is supplied through the ADIP band-pass filter 108 to the ADIP decoder 110, by which an ADIP signal, that is, address information, is obtained.

Here, the ADIP band-pass filter 108 switches its passband with a control signal S5 from the driver controller 46 in response to a frequency of wobbles which corresponds to the carrier frequency upon modulation and is different between the MD-DATA1 format and the MD-DATA2 format.

It is to be noted that description of constructions for the switching of calculation processing by the groove information production circuit 142 and the switching of the passband of the ADIP band-pass filter 108 is hereinafter described in detail while it is omitted here.

Further, the RF amplifier 101 executes calculation processing for the optical detection signals obtained from the photo-detector elements I and J upon reproduction to obtain a reproduction RF signal. Since the RF amplifier 101 in the present embodiment performs calculation as digital signal processing, the reproduction RF signal obtained by the RF amplifier 101 is a digitized, that is, binary digitized, signal, or in other words, a binary digitized reproduction RF signal.

The calculation processing of the RF amplifier 101 is common between the MD-DATA1 format and the MD-DATA2 format.

In particular, where the disc is an optical disc for playback only on which data are recorded in the form of pits, the RF amplifier 101 performs calculation processing for the optical detection signals of the photo-detector elements I and J given by $$I+J$$

to obtain a reproduction RF signal.

Further, where the disc is a magneto-optical disc on which data can be rewritten, the RF amplifier 101 performs calculation processing for the optical detection signals of the photo-detector elements I and J given by $$I-J$$

to obtain a reproduction RF signal.

Further, while detailed description and illustration of an internal construction are omitted, the RF amplifier 101 switches an equalization characteristic for the reproduction RF signal such that the applied frequency characteristic of the reproduction RF signal may be different between the MD-DATA1 format and the MD-DATA2 format.

Such switching of the calculation processing corresponding to the type of the disc 51, that is, a pit disc for playback only or a magneto-optical disc and switching of the equalization characteristic depending upon the MD-DATA1 format or the MD-DATA2 format as described above are controlled with a control signal S2 outputted from the driver controller 46.

As can be recognized from the foregoing description, in the optical detection signal processing circuit system in the present embodiment, the signal processing circuit system in a stage following the optical detection signal outputting circuit 53A performs digital signal processing. Consequently, the functioning circuit sections surrounded by an alternate long and short dash line in FIG. 9 can be formed collectively as a single digital signal processing IC (Integrated Circuit) 1300.

6-3. Construction of tracking servo circuit system

Figure 10B:
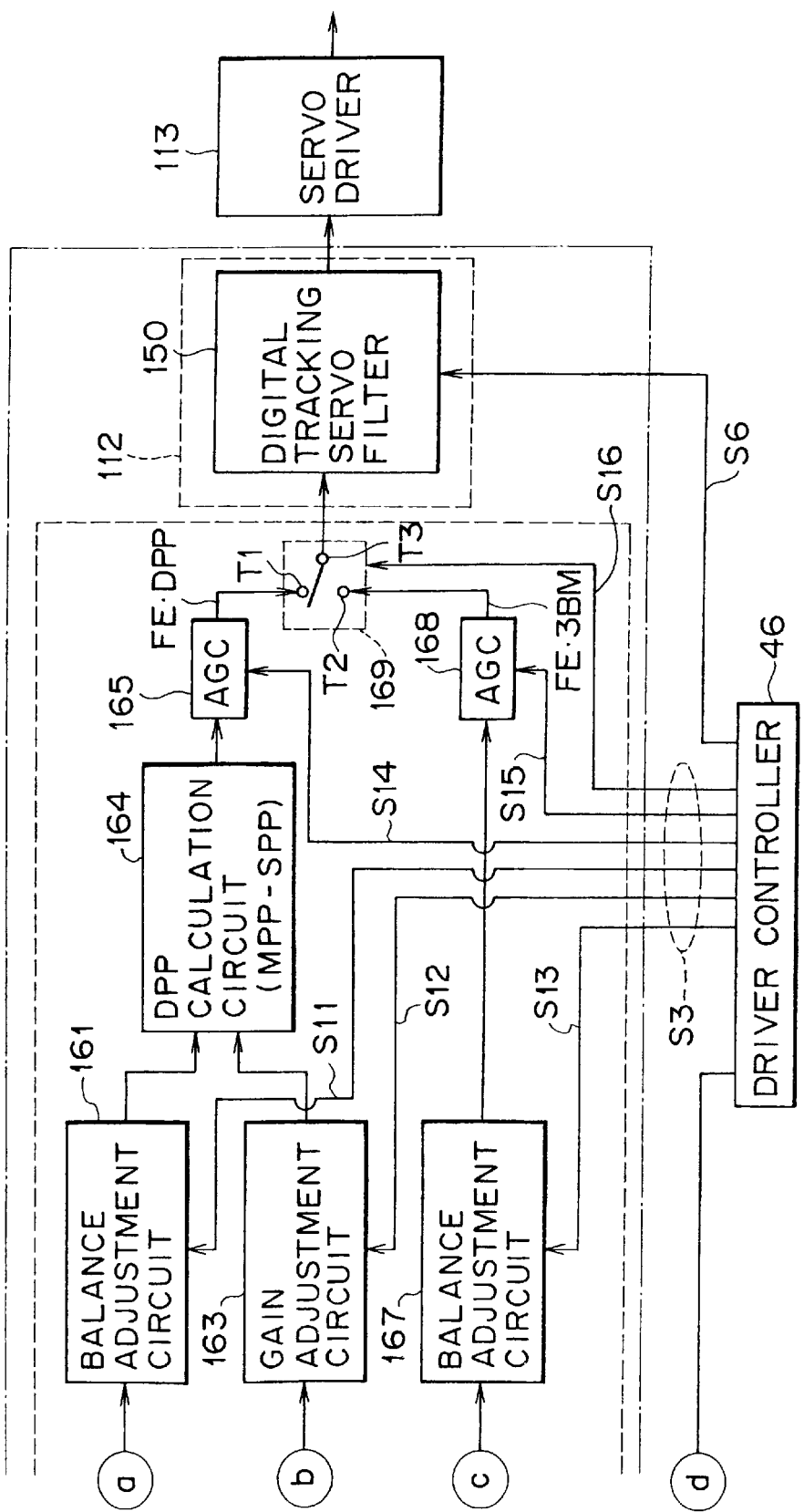
FIG. 10 is a block diagram showing a construction of a tracking servo circuit system of the video camera shown in FIG. 4.

FIG. 10 shows an example of a construction of the tracking servo circuit system in the optical detection signal processing circuit system. In FIG. 10, as the tracking servo circuit system, an internal construction principally of the tracking error signal TE production circuit 141 is shown. It is to be noted that overlapping description of those circuit sections which correspond to the functioning circuit sections described hereinabove with reference to FIGS. 4, 5 and 9 is omitted hereto avoid redundancy.

By the way, for the detection method for a tracking error signal of the MD-DATA formats, a 3-beam method is used for the MD-DATA1 format, and a DPP (Differential Push-Pull) method is used for the MD-DATA2 format.

In the 3-beam method corresponding to the MD-DATA1 format, the optical detection signals from the photo-detector elements E, F, G and H are utilized to execute calculation processing given by $$(E+F)-(G+H)$$

to obtain a tracking error signal.

In contrast, according to the DPP method corresponding to the MD-DATA2 format, in addition to the optical detection signals of the photo-detector elements E, F, G and H, the optical detection signals of the photo-detector elements A, B, C and D are utilized to perform calculation given by $$(A+D)-(B+C)=MPP$$

$$(E-F)-(G-H)=SPP$$

to obtain a main push-pull signal MPP and a sub push-pull signal SPP, and then calculation processing given by $$MPP-SPP$$

is performed to obtain a tracking error signal.

The TE production circuit 141 is constructed so as to produce a tracking error signal which matches with any of the 3-beam method and the DPP method in such a manner as described below.

The TE production circuit 141 includes, as functioning circuit sections which receive the optical detection signals each in the form of a digital signal outputted from the A/D converter 43, an MPP calculation circuit 160, an SPP calculation circuit 162 and a TE calculation circuit 166.

Of the functioning circuit sections, the circuit system on the MPP calculation circuit 160 and the SPP calculation circuit 162 side corresponds to the DPP method while the circuit system on the TE calculation circuit 166 side corresponds to the 3-beam method.

The MPP calculation circuit 160 uses the optical detection signals of the photo-detector elements A, B, C and D to execute calculation processing for obtaining a main push-pull signal MPP, that is, (A+D)−(B+C) and outputs a resulting value to a balance adjustment circuit 161. The balance adjustment circuit 161 performs adjustment so that the terms (A+D) and (B+C) of a result of the calculation may exhibit an appropriate balance and outputs a resulting value to a DPP calculation circuit 164.

The SPP calculation circuit 162 uses the optical detection signals of the photo-detector elements E, F, G and H to execute calculation processing of (E−F)−(G−H) to obtain a sub push-pull signal SPP and outputs the sub push-pull signal SPP to a gain adjustment circuit 163. The gain adjustment circuit 163 performs adjustment of the gain of the sub push-pull signal SPP and supplies the resulting sub push-pull signal SPP to the DPP calculation circuit 164.

The DPP calculation circuit 164 performs calculation processing of MPP−SPP between the main push-pull signal MPP and the sub push-pull signal SPP inputted thereto to produce a focusing error signal FE*DPP in accordance with the DPP method and supplies the focusing error signal FE*DPP to an AGC (Automatic Gain Control) circuit 165. The AGC circuit 165 performs gain adjustment of the focusing error signal FE*DPP and outputs a resulting signal to the terminal T1 of a switch 169.

The balance setting of the balance adjustment circuit 161, the gain setting of the gain adjustment circuit 163 and the gain setting of the AGC circuit 165 are controlled with control signals S11, S12 and S14 outputted from the driver controller 46, respectively, so that operation conditions required for the DPP method may individually be satisfied.

It is to be noted that the control signals S11, S12 and S14 and S13, S15 and S16 which will be hereinafter described are generally denoted as a control signal S3 in FIG. 9.

The TE calculation circuit 166 makes use of the optical detection signals of the photo-detector elements E, F, G and H to perform calculation processing of (E+F)−(G+H) to obtain a focusing error signal FE*3BM corresponding to the 3-beam method. The focusing error signal FE*3BM undergoes balance adjustment between the term of (E+F) and the term of (G+H) in a result of the calculation by a balance adjustment circuit 167, undergoes gain adjustment by an AGC circuit 168 and is then supplied to the terminal T2 of the switch 169.

Here, the setting of the gain of the AGC circuit 168 is controlled with a control signal S13 outputted from the driver controller 46.

In the switch 169, the terminal T3 is alternatively connected to the terminal T1 or the terminal T2, and the switching is controlled with a control signal S16 outputted from the driver controller 46. The terminal T3 is connected, for example, to an input of a digital tracking servo filter 150 in the servo processor 112.

In the switch 169, if it is discriminated by the driver controller 46 that the disc 51 loaded in the deck section 5 has the MD-DATA2 format, then the terminal T1 and the terminal T3 are connected to each other, but if it is discriminated that the disc 51 has the MD-DATA1 format, then the terminal T2 and the terminal T3 are connected to each other.

Consequently, when it is discriminated that the disc 51 has the MD-DATA2 format, a tracking error signal TE DPP detected in accordance with the DPP method is supplied to the digital tracking servo filter 150, but when it is discriminated that the disc 51 has the MD-DATA1 format, a tracking error signal TE*3BM detected in accordance with the 3-beam method is supplied to the digital tracking servo filter 150.

In the present embodiment, calculation processing and signal processing corresponding to the DPP method or the 3-beam method as a detection method for a tracking error signal are performed in response to a difference between the MD-DATA2 format and the MD-DATA1 format of the disc 51 in such a manner as described above.

Further, the tracking error signal TE*DPP obtained in accordance with the DPP method and the tracking error TE*3BM obtained in accordance with the 3-beam method have a difference in signal level from each other.

Consequently, for example, in order to correct the difference to execute appropriate tracking servo control, the driver controller 46 outputs a control signal S6 to the digital tracking servo filter 150 to control the digital tracking servo filter 150 so that it may set different servo gains depending upon whether the tracking error signal TE*DPP is inputted or the tracking error signal TE*3BM is inputted.

It is to be noted that the control signal S6 functions also as a signal for performing switching control of the servo gain for some other servo control as hereinafter described.

The digital tracking servo filter 150 performs required filtering processing for the tracking error signal TE*DPP detected in accordance with the DPP method or the tracking error signal TE*3BM detected in accordance with the 3-beam method and inputted thereto to produce a tracking control signal as a servo control signal and outputs the tracking control signal to the servo driver 113.

Due to the construction described above, in the present embodiment, tracking control can be executed in accordance with a detection method for a tracking error signal which is different between the MD-DATA1 format and the MD-DATA2 format, that is, in accordance with the 3-beam method or the DPP method.

6-4. ADIP processing circuit system

Subsequently, the ADIP processing circuit system of the optical detection signal processing circuit system is described.

Figure 11:
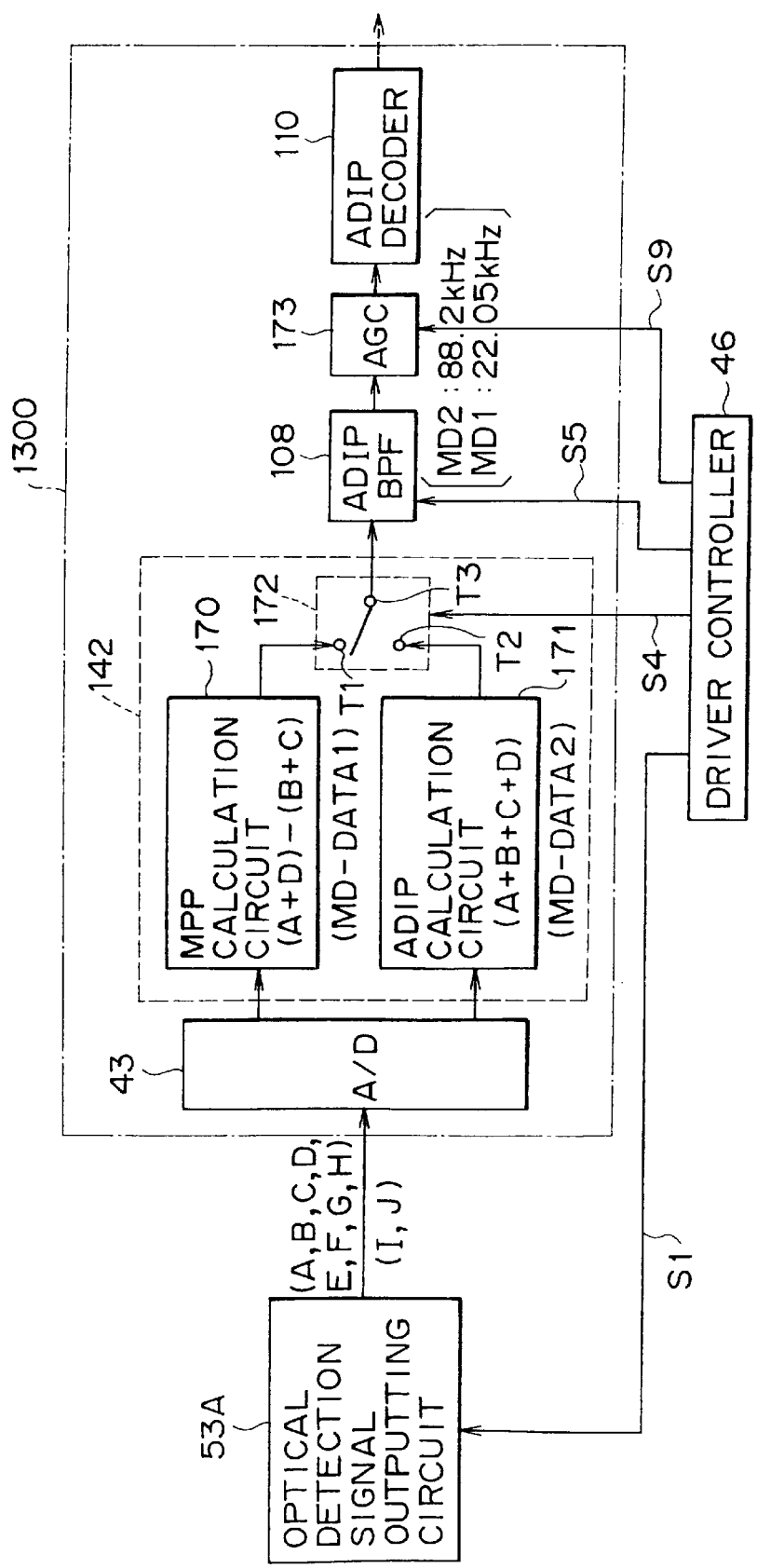
FIG. 11 is a block diagram showing a construction of an ADIP processing circuit system of the video camera shown in FIG. 4.

A block diagram of FIG. 11 shows an example of a construction of the ADIP processing circuit system. Referring to FIG. 11, as the ADIP processing circuit system, an internal construction principally of the groove information production circuit 142 is shown. It is to be noted that overlapping description of functioning circuit sections in FIG. 11 similar to those shown in FIGS. 4, 5 and 9 is omitted here to avoid redundancy.

As described hereinabove, as an addressing method, the single spiral double-side wobble method is used for the MD-DATA1 format, and the interlace address method is used for the MD-DATA2 format. Further, the carrier frequencies, that is, the groove frequencies, for them upon address information encoding are different from each other.

Consequently, switching of calculation processing for production of groove information is performed by the groove information production circuit 142 depending upon whether the disc 51 has the MD-DATA1 format or the MD-DATA2 format.

Referring to FIG. 11, an optical detection signal in the form of a digital signal outputted from the A/D converter 43 is supplied to an MPP calculation circuit 170 and an ADIP calculation circuit 171.

The MPP calculation circuit 170 performs calculation processing for producing groove information in accordance with the MD-DATA1 format. The MPP calculation circuit 170 executes calculation processing of (A+D)−(B+C) to produce a main push-pull signal MPP, and the main push-pull signal MPP is outputted as groove information GFM matching with the MD-DATA1 format to the terminal T1 of a switch 172.

It is to be noted that, where the MPP calculation circuit 170 and the MPP calculation circuit 160 described hereinabove with reference to FIG. 10 are compared with each other, since they execute similar calculation processing except that the MPP calculation circuit 160 is a functioning circuit section corresponding to the MD-DATA2 format and the MPP calculation circuit 170 is a functioning circuit corresponding to the MD-DATA1 format, if, for example, balance adjustment, gain adjustment and so forth in a preceding stage or a following stage are set suitably, the MPP calculation circuits 160 and 170 can be formed commonly so that they are constructed collectively as a single functioning circuit section.

The ADIP calculation circuit 171 performs calculation processing for producing groove information matching with the MD-DATA2 format. The ADIP calculation circuit 171 executes calculation processing of (A+B+C+D) to produce groove information GFM matching with the MD-DATA2 format and outputs the groove information GFM to the terminal T2 of the switch 172.

In the switch 172, the terminal T1 or the terminal T2 is alternatively connected to the terminal T3, and the terminal T3 is connected to an input of the ADIP band-pass filter 108.

Switching of the terminals of the switch 172 is performed with a control signal S4 outputted from the driver controller 46. If it is discriminated that the disc 51 loaded in the deck section 5 has the MD-DATA1 format, the switch 172 is controlled so that the terminal Ti and the terminal T3 are connected to each other. Consequently, groove information obtained by the MPP calculation circuit 170 is supplied to the ADIP band-pass filter 108.

On the other hand, if it is discriminated that the disc 51 has the MD-DATA2 format, then the switch 172 is controlled so that the terminal T2 and the terminal T3 are connected to each other. Consequently, groove information obtained by the ADIP calculation circuit 171 is supplied to the ADIP band-pass filter 108.

While groove information formed as wobbles on a disc is obtained by bi-phase modulating an ADIP signal which is address information and FM modulating the bi-phase modulated ADIP signal, in the present embodiment, the carrier frequency upon the FM modulation is 22.05 kHz for the MD-DATA1 format, but is 88.2 kHz for the MD-DATA2 format.

Accordingly, the ADIP band-pass filter 108 is switched such that, when the disc 51 has the MD-DATA1 format, a required band-pass corresponding to the carrier frequency 22.05 kHz is set, but when the disc 51 has the MD-DATA2 format, a pass-band corresponding to the carrier frequency 88.2 kHz is set.

Also the switching control of the pass-band is performed by the driver controller 46 which discriminates the disc format of the disc 51 and outputs a control signal S5 based on a result of the discrimination. Such change of the pass-band can be performed simply and readily by digital processing.

By employing such construction as described above, groove information can be detected from optical detection signals to obtain address information in accordance with an addressing method which is different between the MD-DATA1 format and the MD-DATA2 format. Further, while, in the present embodiment, the disc is driven to rotate in accordance with the CLV method, the embodiment is advantageous also where the CAV (Constant Angular Velocity) system is adopted alternatively.

Further, if necessary, the gain of the 173 in a stage following the ADIP band-pass filter 108 may be switched with a control signal S9 from the driver controller 48 depending upon whether it is discriminated that the disc 51 has the MD-DATA1 format or the MD-DATA2 format.

6-5. Spindle servo circuit system

Subsequently, a construction of the spindle servo circuit system for CLV driving the spindle motor 52 is described with reference to FIG. 12. It is to be noted that overlapping description also of functioning circuit sections in FIG. 12 similar to those shown in FIGS. 4, 5 and 9 is omitted here to avoid redundancy.

While, in the description above with reference to FIG. 5, it is described that the spindle error signal SPE of the CLV processor 111 is produced based on the ADIP signal obtained by the ADIP decoder 110, it is otherwise possible to adopt a system wherein the spindle error signal SPE is obtained based on a reproduction RF signal for both of the MD-DATA1 format and the MD-DATA2 format.

Figure 12:
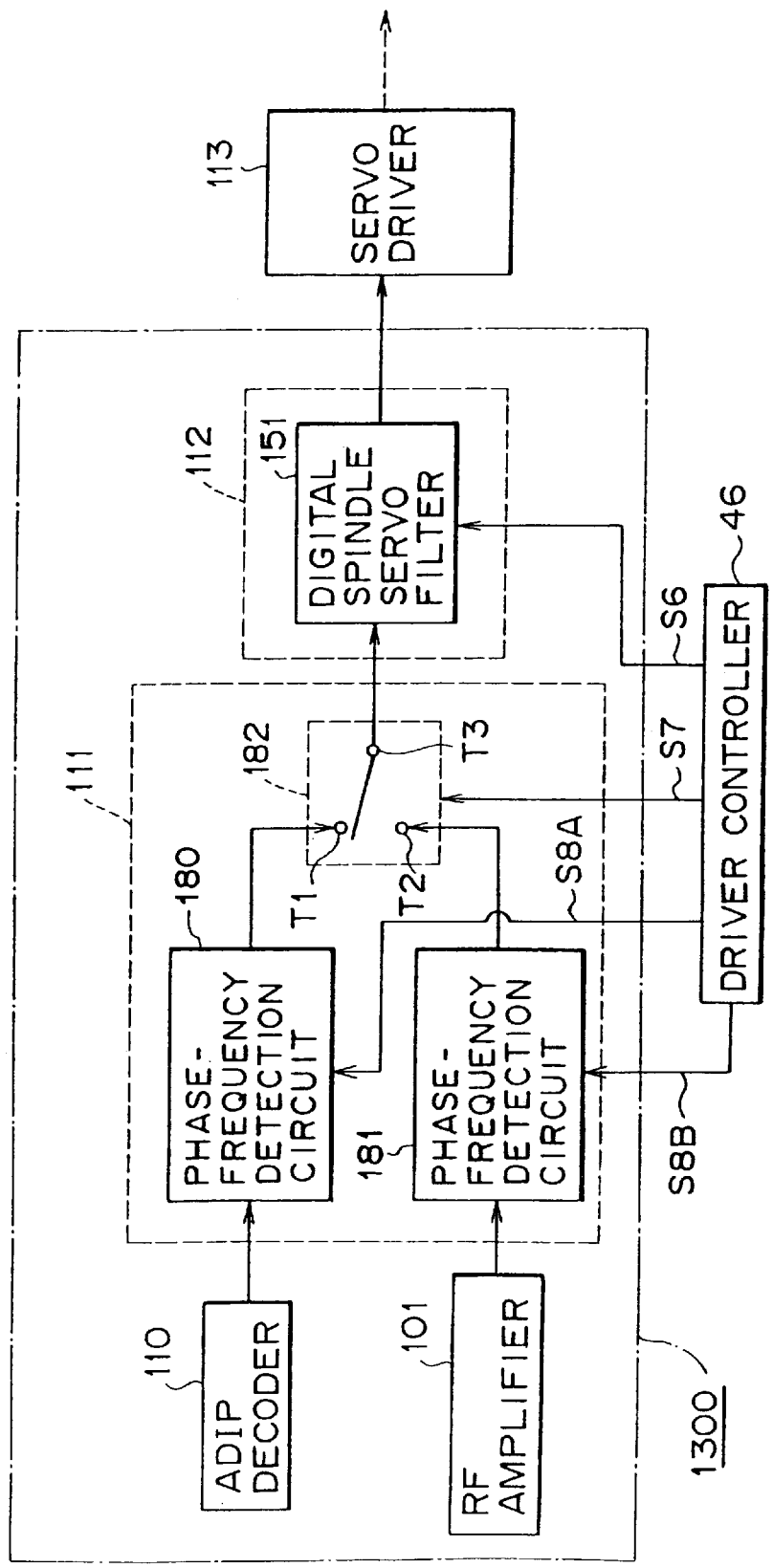
FIG. 12 is a block diagram showing a construction of a spindle servo circuit system of the video camera shown in FIG. 4.

Accordingly, the spindle servo circuit system shown in FIG. 12 is constructed such that, for production processing of the spindle error signal SPE, one of a system which is based on an ADIP signal and another system which is based on a reproduction RF signal can be selectively used.

Referring to FIG. 12, as a circuit system which produces a spindle error signal SPE based on an ADIP signal, a phase and frequency detection circuit 180 to which an ADIP signal obtained by the ADIP decoder 110 is inputted is provided.

The phase and frequency detection circuit 180 uses, for example, an error information signal indicative of a frequency difference obtained by comparison between an ADIP signal frequency and a target value set corresponding to a defined CLV velocity matching with a disc format and another error information signal indicative of a phase difference between an ADIP signal and the clock CLK to produce a spindle error signal SPE. The spindle error signal SPE obtained by the phase and frequency detection circuit 180 is supplied to the terminal T1 of a switch 182.

On the other hand, as a circuit system which produces a spindle error signal SPE based on a reproduction RF signal, a phase and frequency detection circuit 181 which receives a reproduction RF signal obtained by the RF amplifier 101, that is, a binary digitized reproduction RF signal is provided.

Also the phase and frequency detection circuit 181 uses, for example, an error information signal indicative of a frequency difference obtained by comparison between the frequency of a received reproduction RF signal and a target value set corresponding to a defined CLV velocity matching with a disc format and another error information signal indicative of a phase error between an ADIP signal and the clock CLK to produce a spindle error signal SPE.

The spindle error signal SPE obtained by the phase and frequency detection circuit 181 is supplied to the terminal T2 of the switch 182.

Also the switch 182 is constructed such that the terminal T1 or the terminal T2 is alternatively connected to the terminal T3, and the terminal T3 is connected to an input of a digital spindle servo filter 151 in the servo processor 112.

The switching of terminal connection of the switch 182 is controlled with a control signal S7 outputted from the driver controller 46 so that one of the spindle error signals SPE of the phase and frequency detection circuit 180 and the phase and frequency detection circuit 181 is supplied to the digital spindle servo filter 151.

Here, while various discrimination factors may be available as a discrimination factor for the terminal switching control by the driver controller 46, it is a possible idea to construct the discrimination element, for example, such that one of the spindle error signals SPE with which a more appropriate spindle servo controlling condition is obtained in response to a rotation condition of the spindle motor such as rotation upon starting of rotation or rotation in a condition wherein the PLL is locked. Further, depending upon the case, it may be possible to fixedly set the switched condition of the switch 182 in an initial stage.

In the construction shown in FIG. 12, the CLV processor 111 is formed from the phase and frequency detection circuits 180 and 181 and the switch 182.

As described hereinabove with reference to FIGS. 2A and 2B, the CLV velocity is different between the MD-DATA1 format and the MD-DATA2 format such that, for the MD-DATA1 format, it is prescribed to be 1.2 m/s which corresponds to approximately 11 Hz as an innermost circumference rotational velocity, and for the MD-DATA2 format, it is prescribed to be 2.0 m/s which corresponds to approximately 22 Hz as an innermost circumference rotational velocity.

Consequently, the target value to be compared with the ADIP signal frequency or the reproduction RF signal frequency by the phase and frequency detection circuit 180 or 181 must be switched to a required value in accordance with a disc format. Thus, the spindle servo circuit system should be constructed such that also the switching control of the target value is performed with a control signal S8A or S8B outputted from the driver controller 46 as seen from FIG. 12.

Further, since the CLV velocity is different depending upon a disc format, the transmission characteristic of the spindle motor 52 itself for the MD-DATA2 format provides a difference of approximately −6 dB from that for the MD-DATA1 format.

Consequently, where the disc 51 has the MD-DATA2 format, the driver controller 46 outputs a control signal S6 to perform control of switching the servo gain so that correction by +6 dB may be performed by the digital spindle servo filter 151.

By the construction described above, spindle servo control which conforms with any of the MD-DATA1 format and the MD-DATA2 format can be achieved.

6-6. Processing operation

An example of processing operation when operation control of the driver controller 46 for the optical detection signal processing circuit system described hereinabove with reference to FIGS. 9, 10, 11 and 12 is executed actually is illustrated in a flow chart of FIG. 13. It is to be noted that, for example, processing operation upon reproduction is illustrated in FIG. 13.

In the processing illustrated in FIG. 13, first in step S101, it is discriminated, as a disc type of the disc 51, which one of the MD-DATA1 format and the MD-DATA2 format the disc 51 has. The discrimination processing may be performed, for example, based on the shape of an identification shape which is physically formed in a cartridge of the disc 51 and indicates a distinction between the MD-DATA1 format and the MD-DATA2 format. In this instance, a detection mechanism which can detect the identification shape is provided in the disc slot 203 of the deck section 5.

Alternatively, for example, identification information representative of a disc format in management information read out from the management information area of a disc may possibly be utilized.

If it is discriminated in step S101 that the disc 51 has the MD-DATA2 format, then the control advances to step S102, but if it is discriminated that the disc 51 has the MD-DATA1 format, the control advances to step S112.

It is to be noted that, in FIG. 13, the MD-DATA1 format is represented in an abbreviated form as "MD1" and the MD-DATA2 format is represented in an abbreviated form as "MD2" for convenience of illustration.

In step S102, control processing for setting circuit operation of the tracking servo circuit system corresponding to the DPP method is executed. More particularly, as described hereinabove with reference to FIG. 10, the driver controller 46 outputs a control signal S16 to perform switching control of the switch 169 so that the tracking error TE*DPP may be inputted to the servo processor 112.

In next step S103, servo gains for focusing servo control, tracking servo control and sled servo control are set so that they may conform with the MD-DATA2 format. This is performed, as described hereinabove with reference to FIGS. 9, 10 and 12, by the driver controller 46 which outputs a control signal S6 to the digital servo filter corresponding to each of the servo controls described above.

Thereafter, in step S104, the focusing servo is rendered on. In short, after focusing pull-in control is performed, the focusing servo loop is closed to start focusing servo control.

In step S105, balance adjustment is performed by the balance adjustment circuit 161 provided in the following stage to the MPP calculation circuit 160 as described hereinabove, and then in step S106, gain adjustment is performed by the gain adjustment circuit 163 in the following stage to the SPP calculation circuit 162. Further, in step S107, control for gain setting of the AGC circuit 165 is executed.

In step S108, the tracking servo loop is closed to start tracking servo control, and then in step S109, sled servo control is started.

In next step S110, control for switching the servo gain so that correction by +6 dB may be performed is performed by the digital spindle servo filter 151 as described hereinabove with reference to FIG. 12. Then in step S111, control for switching the pass-band characteristic of the ADIP band-pass filter 108 so as to correspond to 88.2 kHz for the MD-DATA2 format as described hereinabove with reference to FIG. 11 is executed, whereafter the control advances to step S121.

On the other hand, if it is discriminated in step S101 that the disc 51 has the MD-DATA1 format, then first in step S112, controlling processing for setting circuit operation of the tracking servo circuit system so that it may match with the 3-beam method is executed. More particularly, the driver controller 46 outputs a control signal S16 to perform switching control of the switch 169 so that the tracking error TE*3BM may be inputted to the servo processor 112 as described hereinabove with reference to FIG. 10.

In next step S113, servo gains for focusing servo control, tracking servo control and sled servo control are set such that they may conform with the MD-DATA1 format. This is performed by the driver controller 46 which outputs a control signal S6 to each of the digital servo filters as described hereinabove with reference to FIGS. 9, 10 and 12.

Then, focusing servo is rendered on in next step S114, whereafter control advances to step S115.

In step S115, balance adjustment of the balance adjustment circuit 167 of the TE calculation circuit is performed as described hereinabove with reference to FIG. 10. In next step S116, control for gain setting of the AGC circuit 168 is executed.

In next step S117, the tracking servo loop is closed to start tracking servo control, and then in step S118, sled servo control is started.

In step S119, control for switching the servo gain of the digital spindle servo filter 151 so that it may conform with the MD-DATA1 format is executed. In this instance, a lower required gain is set so that a level by −6 dB with respect to the servo gain set by the processing in step Silo described hereinabove may be obtained.

In next step S120, control for switching the passband characteristic of the ADIP band-pass filter 108 so that it may correspond to 22.05 kHz for the MD-DATA1 format is executed, whereafter the control advances to step S121.

In step S121, it is waited that the speed of rotation of the spindle motor converges into a prescribed speed range in which the speed of rotation can be locked and then the spindle servo loop is closed to start the spindle servo control.

Then in step S122, the ADIP signal is read out to acquire address information, and in next step S123, controlling processing for reading out data recorded on the disc 51 is executed.

7. Modifications

Figure 14:
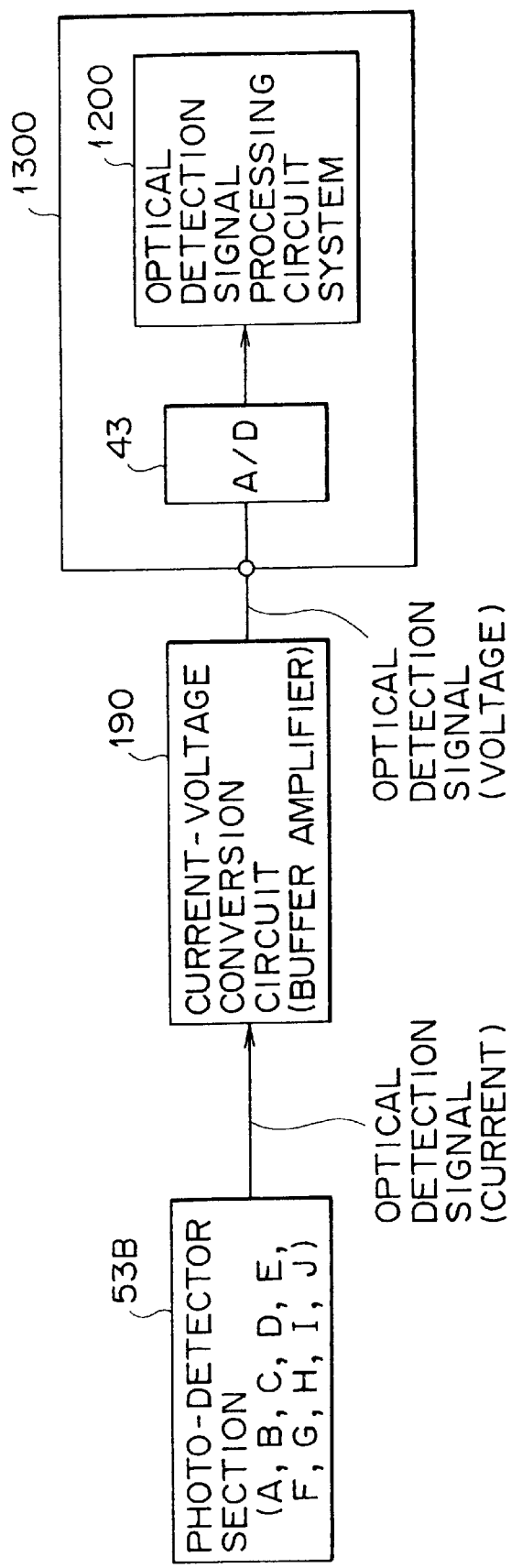
FIG. 14 is a block diagram schematically showing another example of an entire structure of the optical detection signal processing circuit of the video camera shown in FIG. 4.

The operating detection signal processing circuit system in the present embodiment may have such a modified construction as shown in FIG. 14 where the optical detection signal outputting circuit 53A including an I-V converter is not provided in the optical head 53 side.

Referring to FIG. 14, the modified optical detection signal processing circuit system includes a photo-detector section 53B which outputs optical detection signals each in the form of current obtained by the photo-detector elements A to J. The photo-detector section 53B is provided in the optical head 53.

Further, a digital signal processing IC 1300 shown includes an A/D converter 43 and an optical detection signal processing circuit system 1200 in the following stage to the A/D converter 43. Here, the optical detection signal processing circuit system 1200 corresponds to a circuit system which includes the functioning circuit sections in the digital signal processing IC 1300 described hereinabove with reference to FIGS. 9, 10, 11 and 12.

In such an instance as described above, a current to voltage conversion circuit 190 is provided between the photo-detector section 53B and the digital signal processing IC 1300.

The current to voltage conversion circuit 190 converts optical detection signals each in the form of current from the photo-detector elements A to J into voltage signals and supplies the voltage signals to the A/D converter 43.

The current to voltage conversion circuit 190 can be formed with a simple construction including a buffer amplifier merely having a current to voltage conversion function and so forth.

While, in the embodiment described above, where the disc has the MD-DATA2 format, recording is performed on a land of the disc, alternatively recording may be performed on a groove. Further, while, where the disc has the MD-DATA1 format, recording is performed on a groove, alternatively recording may be performed on a land.

Furthermore, while, in the embodiment described above, the present invention is applied to a magneto-optical disc, the present invention may be applied otherwise to a CD-R or a DVD-RW of the phase variation type.

It is to be noted that, while it is described that, in the embodiment described above, the MD-DATA formats are used for a medium format, the present invention can naturally be applied to any other medium format only if the recording medium is an optical recording medium and optical detection signal processing is required for recording and reproduction of the optical recording medium.

Further, while, in the foregoing description a case is described wherein a construction for obtaining compatibility between the MD-DATA1 format and the MD-DATA2 format is obtained, also in this regard, the present invention can be constructed so that compatibility may be obtained between some other medium formats.

Further, while the foregoing description of the embodiment of the present invention is directed to a video camera, the present invention can be applied also to a recording and reproduction apparatus in the form of a unitary apparatus which can perform recording or reproduction in accordance with an optical recording medium.

While a preferred embodiment of the present invention has been described using specific terms, such description is for illustrative purposes only, and it is to be understood that changes and variations may be made without departing from the spirit or scope of the following claims.

What is claimed is:

1. A reproduction apparatus for selectively playing back a first optical disc wherein two side faces of each of grooves or lands formed thereon are wobbled at a first frequency and address information is recorded on the wobbled grooves or lands in advance and a second optical disc wherein one of two side faces of each of grooves or lands formed thereon is wobbled at a second frequency while the other side face of each of the grooves or lands is formed as a flat face and address information is recorded on the grooves or lands in advance, comprising:

an optical head for irradiating light upon a predetermined one of the grooves or lands and those of the lands or grooves adjacent the predetermined groove or land;

detection means divided into at least two regions in a tracing direction of said optical head for detecting reflected light from the predetermined groove or land and the adjacent lands or grooves;

first calculation means for adding detection outputs of said at least two regions of said detection means;

second calculation means for subtracting a first one from a second one of the detection outputs of said at least two regions of said detection means;

discrimination means for discriminating whether an optical disc loaded on said reproduction apparatus is the first optical disc or the second optical disc;

selection means for switchably selecting one of said first calculation means and said second calculation means;

controlling means for controlling said selection means so that, when said discrimination means discriminates that the loaded optical disc is the first optical disc, said first calculation means is selected, but when said discrimination means discriminates that the loaded optical disc is the second optical disc, said second calculation means is selected; and address extraction means for extracting address information based on an output of said first or second calculation means selected by said selection means.

2. A reproduction apparatus according to claim 1, further comprising:

extraction means for extracting the first frequency or the second frequency from a result of the calculation of said first or second calculation means selected by said selection means; and switching means for switching an extraction frequency of said extraction means based on a result of the discrimination of said discrimination means.

3. A reproduction apparatus according to claim 1, further comprising rotation controlling means for controlling rotation of the optical disc loaded on said reproduction apparatus based on the frequency extracted by said extraction means.

4. A reproduction apparatus according to claim 3, wherein the first optical disc and the second optical disc are controlled to rotate at different linear velocities from each other, and said reproduction apparatus further comprises gain controlling means for correcting a difference between the linear velocities.

5. A reproduction apparatus according to claim 1, wherein said discrimination means discriminates based on an identification hole formed in a cartridge in which the first optical disc is accommodated and an identification hole formed in a cartridge in which the second optical disc is accommodated.

* * * * *

UNITED STATES PATENT AND TRADEMARK OFFICE
CERTIFICATE OF CORRECTION

PATENT NO. : 6,345,024
DATED : February 5, 2002
INVENTOR(S) : Masashi Sugasawa et al.

It is certified that error appears in the above-identified patent and that said Letters Patent is hereby corrected as shown below:

Column 4,
Line 39, delete "or".

Column 15,
Line 4, change "(RLL" to -- RLL --;
Line 5, change "train)" to -- train --;
Line 8, delete "or";
Line 8, change "th e" to -- the --;
Line 38, change "DATAP" to -- DATAp --;
Line 39, change "DATAP" to -- DATAp --.

Column 19,
Line 49, change "an" to -- a --.

Column 22,
Line 30, change "hereto" to -- here to --.

Column 23,
Line 65, change "TE DPP" to -- TE*DPP --.

Column 25,
Line 33, change "Ti" to -- T1 --.

Column 29,
Line 5, change "Silo" to -- S110 --;
Line 7, change "passband" to -- pass-band --.

Signed and Sealed this

Twenty-first Day of May, 2002

Attest:

*Attesting Officer*

JAMES E. ROGAN
*Director of the United States Patent and Trademark Office*